United States Patent
Doss et al.

(10) Patent No.: US 10,066,376 B2
(45) Date of Patent: *Sep. 4, 2018

(54) TUB FAUCET HAVING A CONTROL VALVE WITHOUT HAMMERING

(71) Applicant: Evolve Technologies, LLC, Scottsdale, AZ (US)

(72) Inventors: Jeffrey S. Doss, Scottsdale, AZ (US); Jason Swanson, Tempe, AZ (US); Heather L. Pinson, Gilbert, AZ (US); John Lockhart, Ridgway, CO (US)

(73) Assignee: Evolve Technologies LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,896

(22) Filed: Mar. 18, 2016

(65) Prior Publication Data

US 2016/0201303 A1 Jul. 14, 2016

Related U.S. Application Data

(63) Continuation-in-part of application No. 14/511,007, filed on Oct. 9, 2014, now Pat. No. 9,737,899.
(Continued)

(51) Int. Cl.
| | |
|---|---|
| *A47K 3/20* | (2006.01) |
| *F16K 1/00* | (2006.01) |
| *F16K 31/12* | (2006.01) |
| *F16K 31/00* | (2006.01) |
| *F16K 17/00* | (2006.01) |
| *F16K 17/38* | (2006.01) |

(Continued)

(52) U.S. Cl.
CPC .............. *E03C 1/0408* (2013.01); *B05B 1/18* (2013.01); *E03B 7/045* (2013.01); *E03B 7/075* (2013.01); *E03C 1/023* (2013.01); *F16K 31/002* (2013.01); *F16K 31/5245* (2013.01); *F16K 31/52475* (2013.01); *F16K 47/023* (2013.01)

(58) Field of Classification Search
CPC ........ F16K 47/00; F16K 47/02; F16K 47/023; F16K 31/002; F16K 31/5247; B05B 1/18; E03C 1/023; E03C 1/0408
USPC ........................................................... 4/570
See application file for complete search history.

(56) References Cited

U.S. PATENT DOCUMENTS 7,434,780 B2 * 10/2008 Hayashi .............. F16K 31/1221
251/12
9,200,724 B2 * 12/2015 Ye .......................... F16K 31/60
(Continued)

*Primary Examiner* — Christine Skubinna
(74) *Attorney, Agent, or Firm* — Culhane Meadows PLLC; Robert C. Klinger

(57) ABSTRACT

A water control system including a showerhead and a tub faucet. The faucet has a valve configured to automatically restrict fluid flow through the faucet and direct fluid to the showerhead as a function of a parameter, such as a predetermined water temperature. The faucet has many modes of operation, including a Reset Mode, an Auto-Divert Mode, a Bypass Mode, and a Cold Mode. One embodiment includes an auto divert tub faucet that can be reset with less than 10 lbs. of force that is ADA compliant. Another embodiment includes a faucet configured to prevent hammering. Another embodiment includes a faucet configured to prevent leakage over time, and another embodiment includes a universal adapter allowing the faucet to be joined to the adapter without requiring hardware.

18 Claims, 24 Drawing Sheets

Related U.S. Application Data

(60) Provisional application No. 62/134,926, filed on Mar. 18, 2015, provisional application No. 61/888,865, filed on Oct. 9, 2013.

(51) Int. Cl.
*E03C 1/04* (2006.01)
*F16K 47/02* (2006.01)
*B05B 1/18* (2006.01)
*E03C 1/02* (2006.01)
*F16K 31/524* (2006.01)
*E03B 7/04* (2006.01)
*E03B 7/07* (2006.01)

(56) References Cited

U.S. PATENT DOCUMENTS

| | | | |
|---|---|---|---|
| 2007/0119989 A1* | 5/2007 | Nagano | E03C 1/023 239/526 |
| 2008/0128028 A1* | 6/2008 | Weltman | E03C 1/296 137/118.05 |
| 2010/0301252 A1* | 12/2010 | Myran | B01D 61/06 251/326 |
| 2011/0180741 A1* | 7/2011 | Lockhart | E03C 1/0408 251/324 |

* cited by examiner

RESET CROSS-SECTION

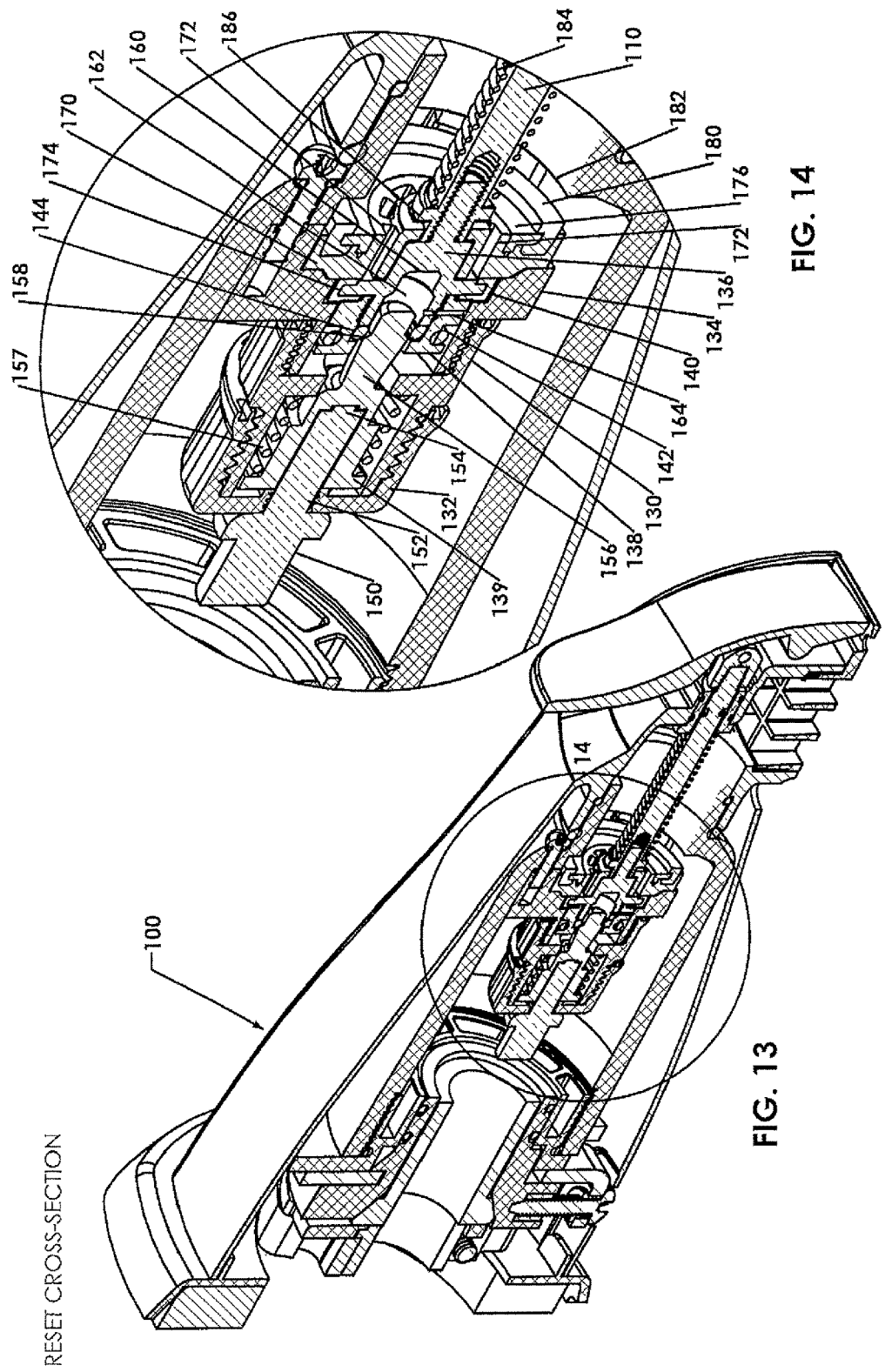

AUTO DIVERT CROSS-SECTION

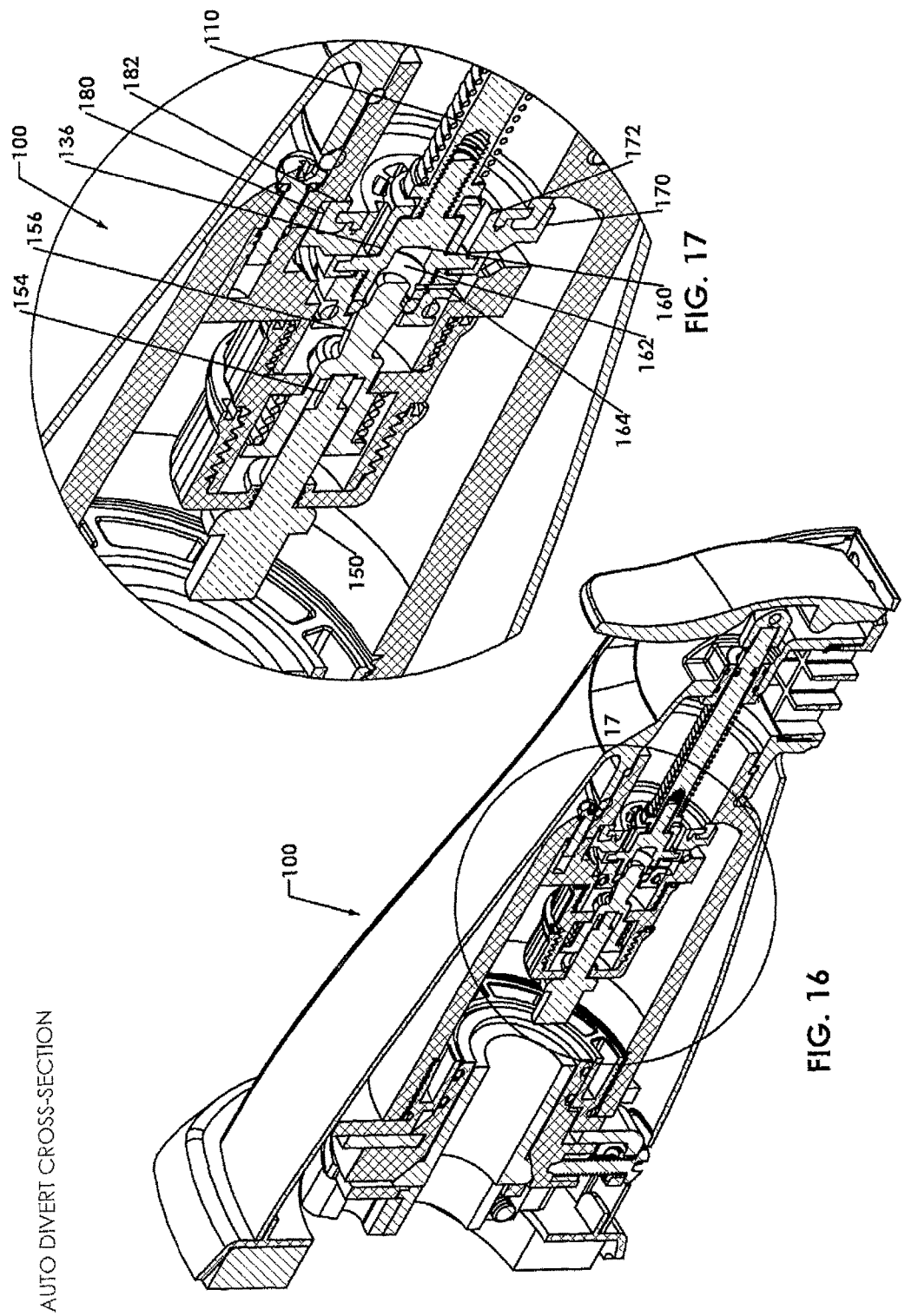

BYPASS CROSS-SECTION

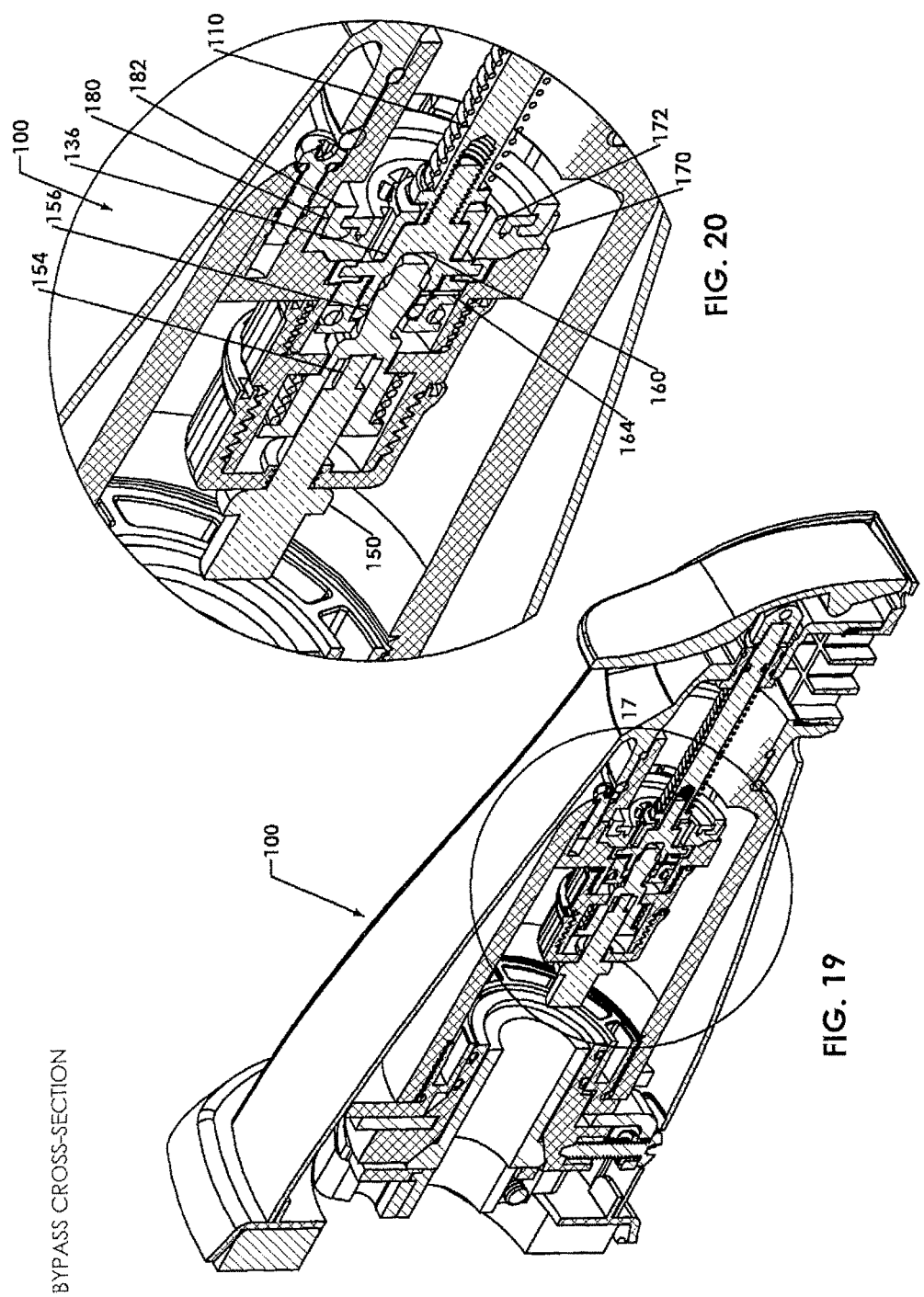

STAGE 1 BYPASS CROSS-SECTION

STAGE 1 BYPASS CROSS-SECTION

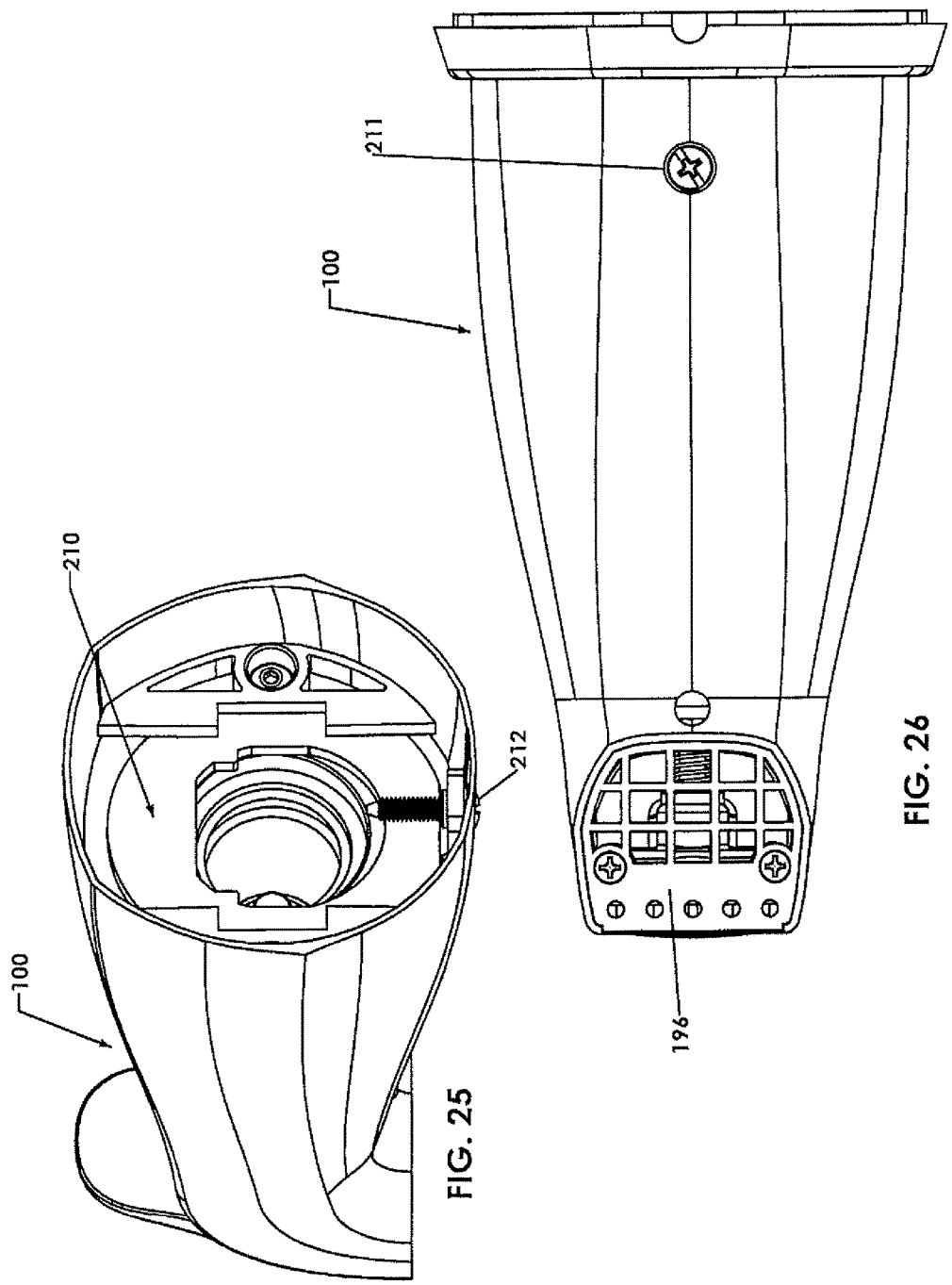

US 10,066,376 B2

TUB FAUCET HAVING A CONTROL VALVE WITHOUT HAMMERING

CLAIM OF PRIORITY

This application is a Continuation-in-Part of U.S. patent application Ser. No. 14/511,007 entitled Water Control System Having a Temperature Controlled Tub Faucet Valve filed Oct. 9, 2014, which application claims priority of U.S. Provisional Application Ser. No. 61/888,865 entitled Multifunctional Restrictive Valve System filed Oct. 9, 2013, the teachings of which are incorporated herein in its entirety.

TECHNICAL FIELD

This disclosure is generally related to restrictive valves, and more specifically to temperature controlled fluid flow restrictive valves such as for use in a tub/shower environment.

BACKGROUND

It is often necessary, in both consumer and commercial contexts, to wait for a water source to reach a suitable temperature prior to use. For example, it is very common for an individual to turn on the hot water in a shower, in a tub, at a sink, or other location, and then wait for an extended length of time until the water is at the correct temperature.

Additionally, vast amounts of water and energy are wasted each year due to the delay in receiving water at the correct temperature. That is, as most individuals are reluctant to stand by the shower and/or tub and continuously monitor the water temperature for many minutes, a significant amount of hot water is simply lost down the drain. This increases both water costs as well as heating costs. Multiplied by the number of individuals that must engage in this practice on a daily basis, the water and energy waste is significant.

A flow control valve utilized in a household, such as to provide the delivery of water to a tub and/or showerhead, typically sees a water pressure up to 120 psi. This high water pressure can affect the operation of the water control valve when it includes moving parts. For instance, the pressure at an upstream port relative to the pressure at a downstream port can negatively affect the performance of the flow control valve. Moreover, this high pressure can require operational portions of the valve to be comprised of more expensive and stronger materials to withstand any pressure differentials between the upstream port, and the downstream port.

In a water system including both a bathing tub and a showerhead, the tub has a faucet that is configured to dispense water at a high rate. Typically, water dispenses through a tub faucet at the high rate, such as 6-10 gallons per minute, as there are no water saving control valves utilized in a tub faucet. When a user wants to take a shower, the user manually activates a diverter valve to redirect heated water away from the tub faucet and to the shower head. This scenario wastes a tremendous amount of water through the tub faucet, considering that the average user may run water through the tub faucet an average of 45 seconds after the water is warm before manually activating the faucet diverter valve to operate the showerhead. If the user steps away from the tube, hot water even more hot water is wasted until the user returns and then activates the diverter valve.

Moreover, temperature controlled water saving valves are not utilized in tub faucets because many users want to take cold showers and baths.

There is desired a water control system including a tub faucet and showerhead that reduces the amount of water waste through the tub faucet before operating the showerhead, or before the tub drain is sealed for a bath, yet which permits a user to override the system.

There is also desired a faucet having an automatic diverter and having a reset that is ADA compliant.

There is also desired a faucet configured to prevent hammering.

There is also desired a faucet configured having an automatic diverter configured to prevent leaking over time.

There is also desired a universal mounting adapter for a faucet having an automatic diverter.

SUMMARY

A water control device and system including a showerhead and a tub faucet. The faucet has a valve configured to automatically restrict fluid flow through the faucet and direct fluid to the showerhead as a function of a parameter, such as a predetermined water temperature. The faucet has many modes of operation, including a Reset Mode, an Auto-Divert Mode, a Bypass Mode, and a Cold Mode. The showerhead may also have a resettable temperature controlled valve configured to stop the flow of water when it reaches a predetermined temperature to prevent water waste, and which showerhead may be a drip type showerhead that is resettable. One embodiment includes an auto divert tub faucet that can be bypassed with less than 10 lbs. of force that is ADA compliant. Another embodiment includes a faucet configured to prevent hammering. Another embodiment includes a faucet configured to prevent leakage over time, and another embodiment includes a universal adapter for a faucet.

BRIEF DESCRIPTION OF THE DRAWINGS

FIG. 13 is a side sectional view taken along line 13-13 in FIG. 10 when the valve in the Reset Mode;

FIG. 14 is an enlarged view of the valve shown in FIG. 13;

FIG. 16 is a side sectional view taken along line 13-13 in FIG. 10 when the valve in the Auto-Divert Mode;

FIG. 17 is an enlarged view of the valve shown in FIG. 16;

FIG. 19 is a side sectional view taken along line 13-13 in FIG. 10 when the valve in the Bypass Mode;

FIG. 20 is an enlarged view of the valve shown in FIG. 18;

FIG. 25 is a rear perspective view of the faucet;

FIG. 26 is a bottom view of the faucet;

DETAILED DESCRIPTION

In one example embodiment of this disclosure, a water control system includes a temperature controlled showerhead and a tub faucet having a temperature controlled valve. The faucet has a hot bypass mode, and a cold bypass mode. In the hot bypass mode, water flows through the faucet until its temperature reaches a predetermined temperature, and then the valve closes and operates as a diverter, directing the heated water to the temperature controlled showerhead. The faucet can be reset to allow water flow through the faucet regardless of water temperature to take a bath. In the cold bypass mode, the faucet can be manually set to divert water to the temperature controlled showerhead, regardless of temperature, such as to provide a cold shower.

Figure 1:
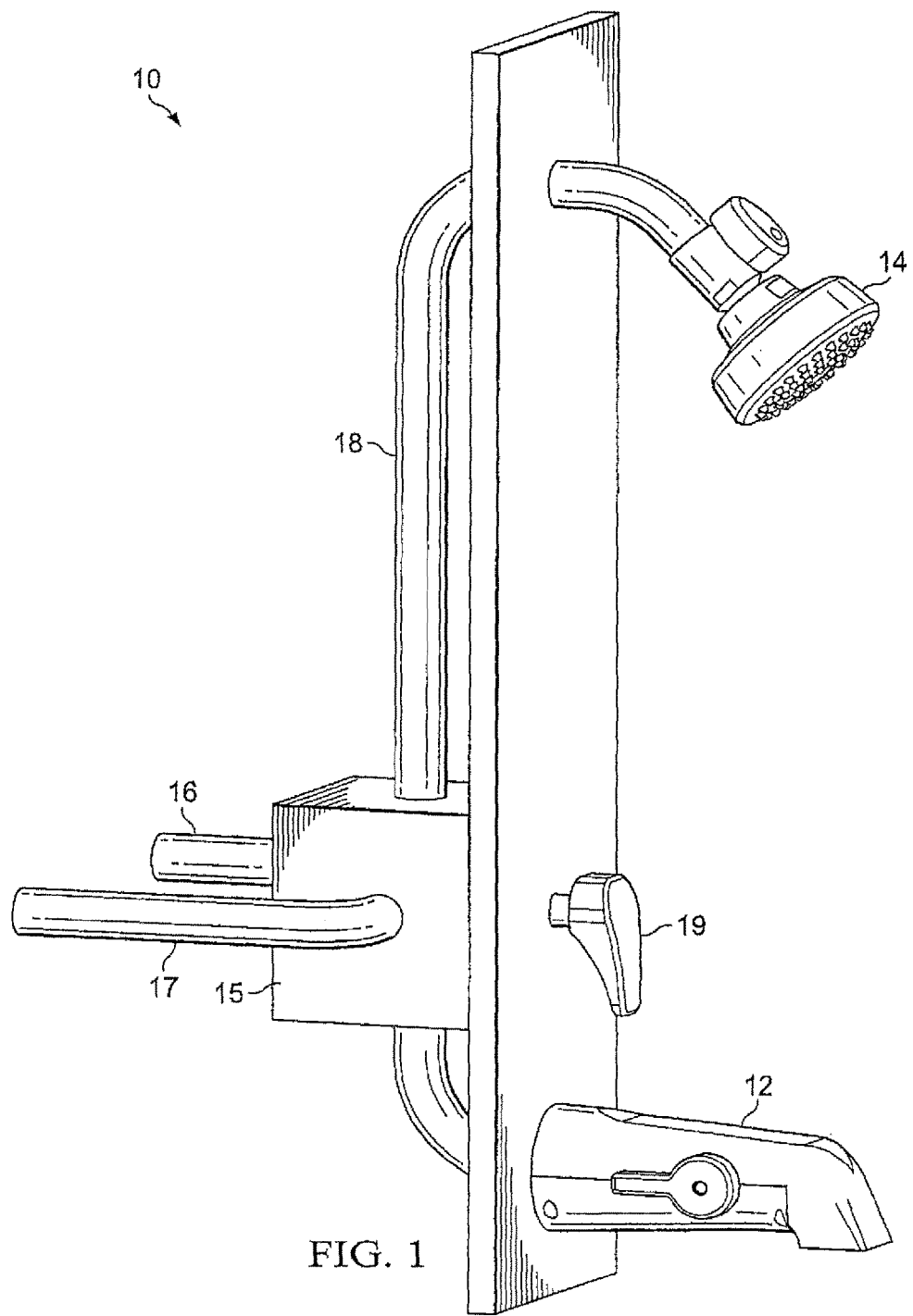
FIG. 1 illustrates a water control system having a showerhead that may be temperature controlled, and a tub faucet including a valve configured to be controlled as a function of a parameter, such as water temperature, according to one example embodiment of the disclosure.

Referring now to FIG. 1 there is shown an example embodiment according to this disclosure depicting a water saving system 10 including a tub faucet 12, a temperature controlled showerhead 14, a water mixing valve 15 configured to receive a cold water from source 16 and hot water from source 17, and plumbing 18 extending between these elements. The mixing valve 15 has a control 19 controllable by a user to establish a desired temperature of water that is provided to the tub faucet 12 and/or showerhead 14 through plumbing 18.

The temperature controlled showerhead 14 has a flow control valve configured to restrict a flow of water through the showerhead as a function of water temperature, such that when the flow of water reaches a predetermined temperature the flow of water is restricted and/or blocked. The reset member allows the user to override the flow control valve and allow water to flow through the showerhead 14 regardless of water temperature, such as to take a shower. Applicant hereby incorporates the teachings of commonly assigned U.S. Pat. No. 8,434,693, filed Dec. 13, 2010 detailing an example of the showerhead 14. In another embodiment, the showerhead 14 may be a conventional drip Navy-type showerhead, or a drip showerhead that can be manually reset to allow water to flow and which is automatically reset when water pressure is removed.

Advantageously, the tub faucet 12 includes a water saving valve 22 positioned in the faucet 12 and is configured to be positioned as a function of the water flowing through the faucet, and also has a manually settable override member 24. The valve 22 is configured to restrict the flow of water through the faucet 12 when water flowing through the faucet reaches and exceeds a temperate threshold. In addition, when the valve 22 is closed, the water flow is automatically directed from the faucet 12 to the showerhead 14. Thus, the valve 22 operates as both a temperature controlled valve and also as a tub spout diverter valve. The valve 22 also includes a manually operable override member 24 configured to disable the valve 22 such that water of any temperature can flow through and exit the valve 22.

Figure 2:
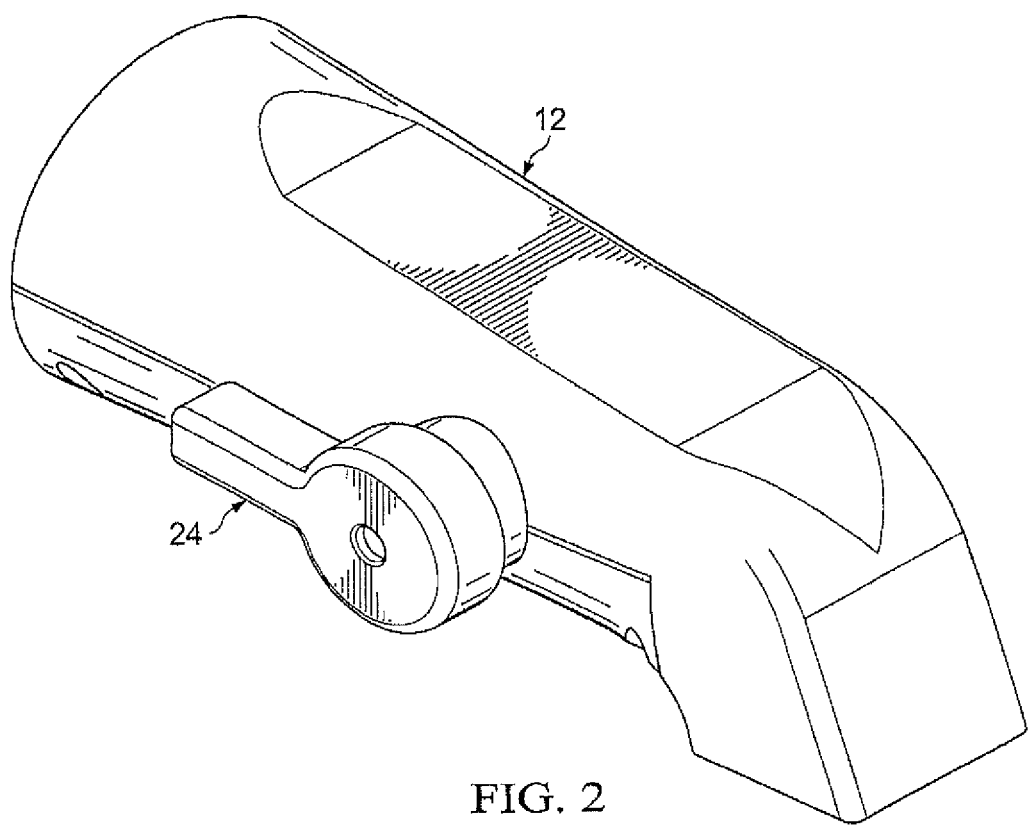
FIG. 2 illustrates a perspective view of a first embodiment of the tub faucet having a manual override control.

Referring to FIG. 2, faucet 12 is shown according to one example embodiment of this disclosure.

Figure 3:
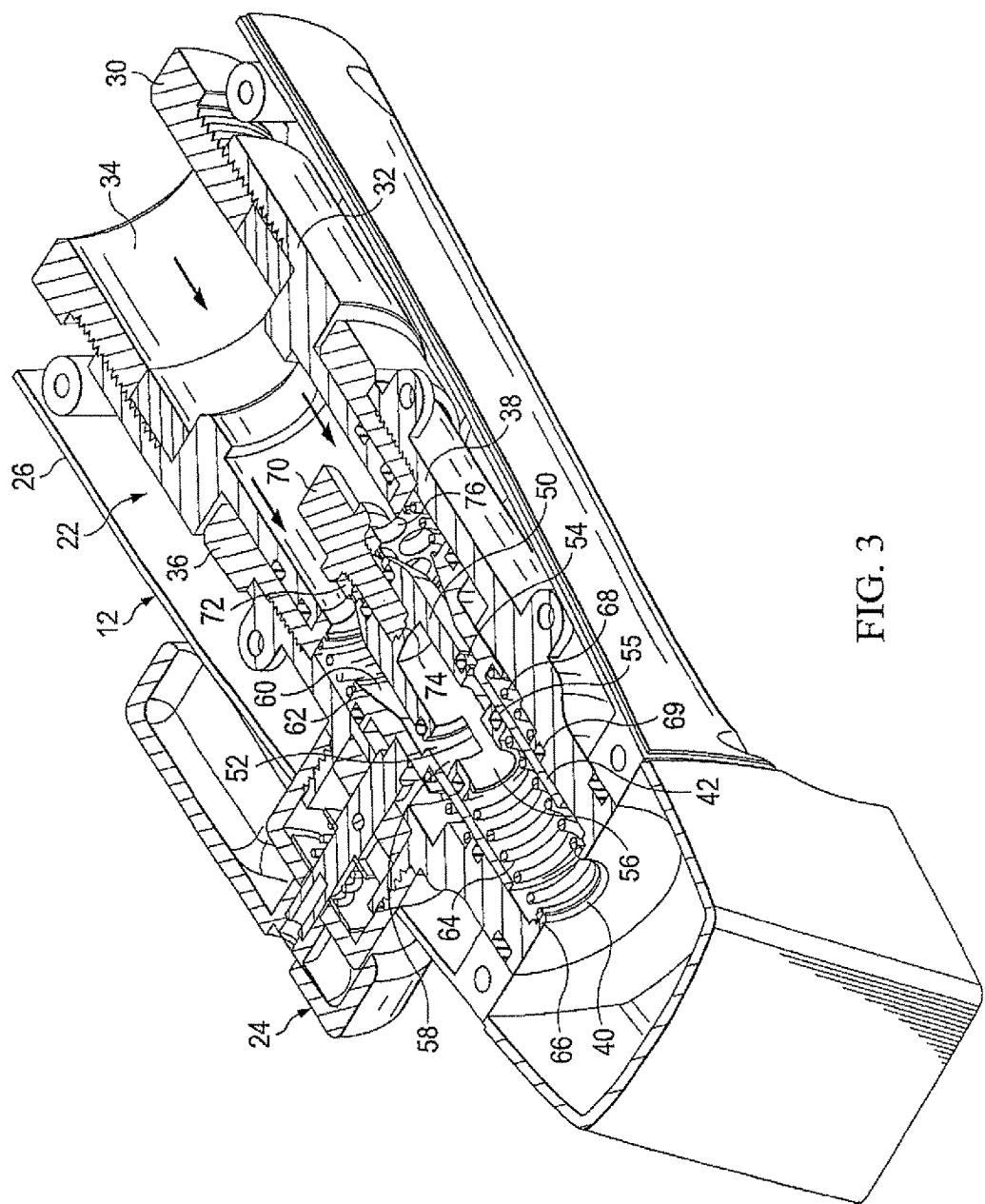
FIG. 3 illustrates a cross section of the faucet temperature controlled valve with the piston in the non-extended position such that water freely flows through the valve and the faucet.

Referring to FIG. 3, cross sectional view of faucet 12 is shown having a valve 22 positioned therein. The valve 22 is shown in a first position allowing water to freely pass through the faucet 12. Valve 22 is secured in a tubular faucet body 26. Valve 22 comprises of an annular body front 30 threadably received into a proximal end of an annular main body 32 secured to faucet body 26. An upstream port 34 is defined at a proximal opening of body front 30. An annular middle body 36 has a proximal end annularly disposed about a distal end of main body 32, and has a distal end threadably received in an annular end body 38. A distal end of end body 38 has a downstream port 40 positioned at the outlet of faucet body 26. An axially slidable sleeve 42 is axially positioned in the end body 38.

A slidable piston 50 is axially and slidably disposed in the sleeve 42. Piston 50 has a recessed middle portion 52 defined between a proximal O-ring 54 and a distal O-ring 55, the recessed piston middle portion 52 forming an annular fluid passageway 56 extending between the piston middle portion 52 and an opposing inner wall 58 of sleeve 42, as shown. When fluid is permitted to flow through valve 22, a fluid path 60 extends from passageway 56 to an outwardly tapered proximal end 62 of sleeve 42. An 0 ring 64 is provided in an annular outer recess at the proximal end 62 providing a fluid seal between the sleeve 42 and the end body 38.

A spring 64 is annularly positioned in the distal end of end body 38 and in the distal end of the piston 50. The spring 64 is compressed, and is engaged against an inner flange 66 at the distal end of end body 38 and a distal end of the piston 50. The spring 64 is configured to bias the piston 50 proximally and away from the flange 66. A spring 68 is annularly positioned in the distal end of end body 38 that encompasses the sleeve 42 and extends between an end flange of end body 38 and a flange of sleeve 42. Spring 68 is configured to bias the sleeve 42 proximally. Seal 69 seals the sleeve 42 with respect to the end body 38.

Figure 4:
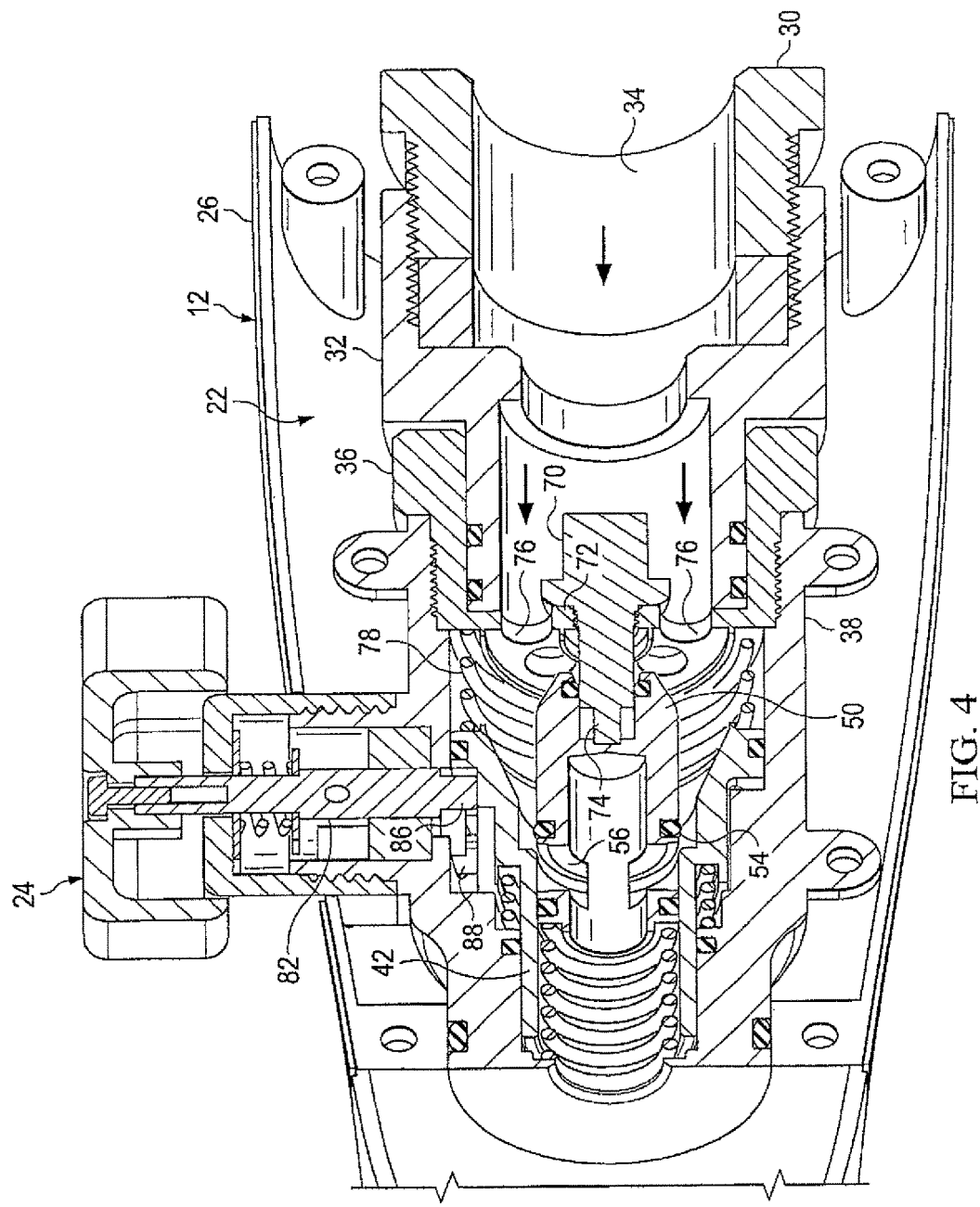
FIG. 4 illustrates a cross section of the faucet temperature controlled valve in the hot bypass mode with the piston in the extended position such that water is automatically restricted from flowing through the faucet when the water reaches a threshold temperature, and also the water automatically directed from the faucet to the temperature controlled showerhead.

The temperature sensitive actuator 70 is axially and threadably received in an annular flange 72 defined at the distal end of middle body 36. The actuator 70 may be a paraffin wax actuator. The actuator 70 has an actuator nose 74 that axially extends and pushes a proximal end of piston 50 when the temperature of water passing about the outer surface of actuator 70, and through openings 76 defined each side of annular flange 72, reaches and exceeds a predetermined temperature. As shown in FIG. 4, the extension of the actuator nose 74 axially pushes the piston 50 distally such that proximal seal 54 of piston 50 extends into the sleeve 42 and closes the passageway 56, thus preventing the flow of water through sleeve 42 and the valve 22. Therefore, the closed valve 22 functions as an automatic diverter, and warmed fluid flow is automatically directed from the faucet 12 to the showerhead 14.

An actuator spring 78 is a secondary spring positioned in the end body 38, and is in the compressive state. Spring 78 is configured to counteract the sleeve 42 when manually put in manual cold bypass mode (FIG. 5) to help the valve 22 reset each time to its original position in the hot bypass mode (FIG. 3 and FIG. 4). The spring 78 engages the proximal end of sleeve 42 and extends to and against the distal end of middle body 36. The spring 78 distally biases the sleeve 42 into the end body 38 as shown in FIG. 3 and FIG. 4, but also permits the sleeve 42 to move proximal as shown in FIG. 5 when urged by the override member 24 to manually close the passageway 56 and prevent flow of fluid through valve 22, regardless of the temperature of the fluid proximate the actuator 70, Thus, water flow is manually directed from faucet 12 to the showerhead 14 at a temperature established by the mixer 16.

Figure 5:
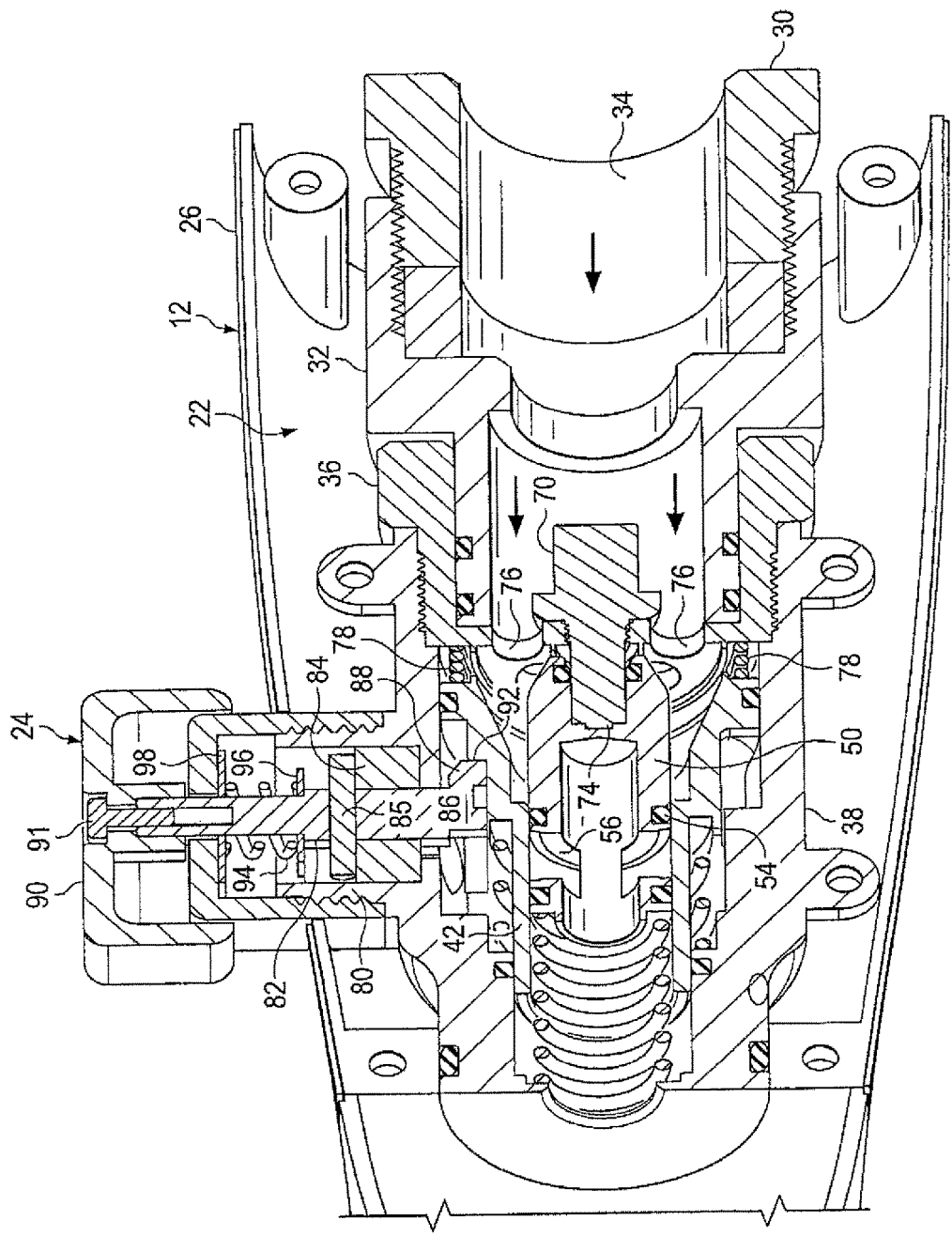
FIG. 5 illustrates a cross section of the faucet including a manual override member configured to disengage the temperature control valve in the cold bypass mode.
Figure 6:
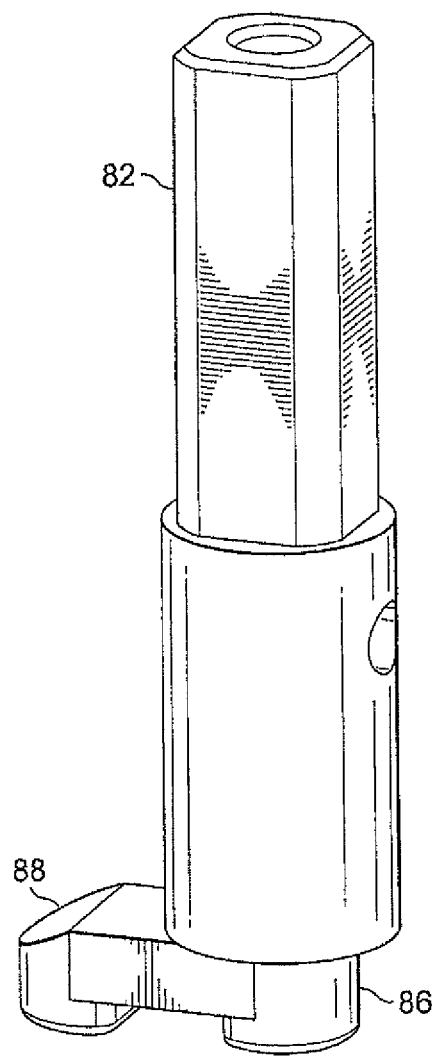
FIG. 6 illustrates a perspective view of the handle and cam.

Referring to FIG. 5, the valve 22 is shown in the cold bypass mode. End body 38 includes a threaded annular extension 80, Extension 80 is configured to receive a radially extending pin 82 extending through a collar 84 having 2 opposing tapered upper surfaces 83, forming a cam. A lever 85 extends radially from a midsection of pin 82 each side of pin 82, and rides upon the respective upper surface of the collar 84 causing the pin 82 to retract away from valve 22 when rotated counterclockwise. The pin 82 is further shown in FIG. 6. The pin 82 has a distal tip portion 86, and has a radially extending cam 88 configured to selectively engage a flanged surface 92 of sleeve 42. A handle 90 is secured to the outer end of pin 82 by a fastener 91, A spring 94 is defined between an annular pin flange 96 and an inner surface of a cap 98. The cap 98 is threadably connected to the extension 80. The spring 94 is configured to assist in returning the handle 24 to the hot bypass mode position when rotated clockwise.

Figure 7:
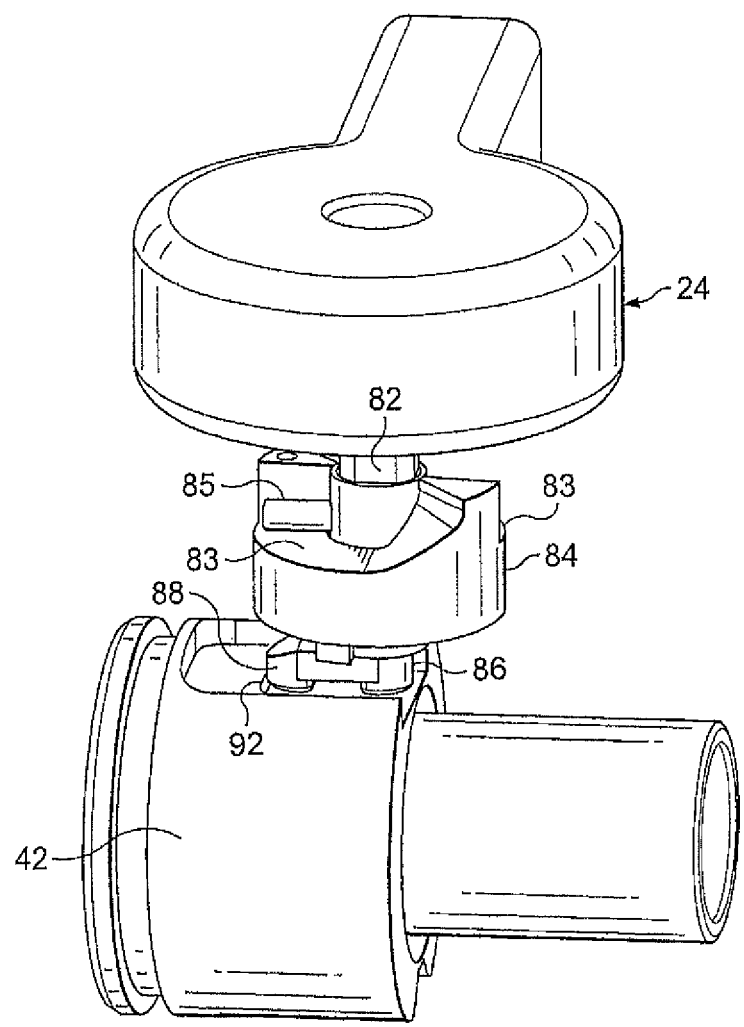
FIG. 7 illustrates the handle and the cam when the valve is in the hot bypass mode.
Figure 8:
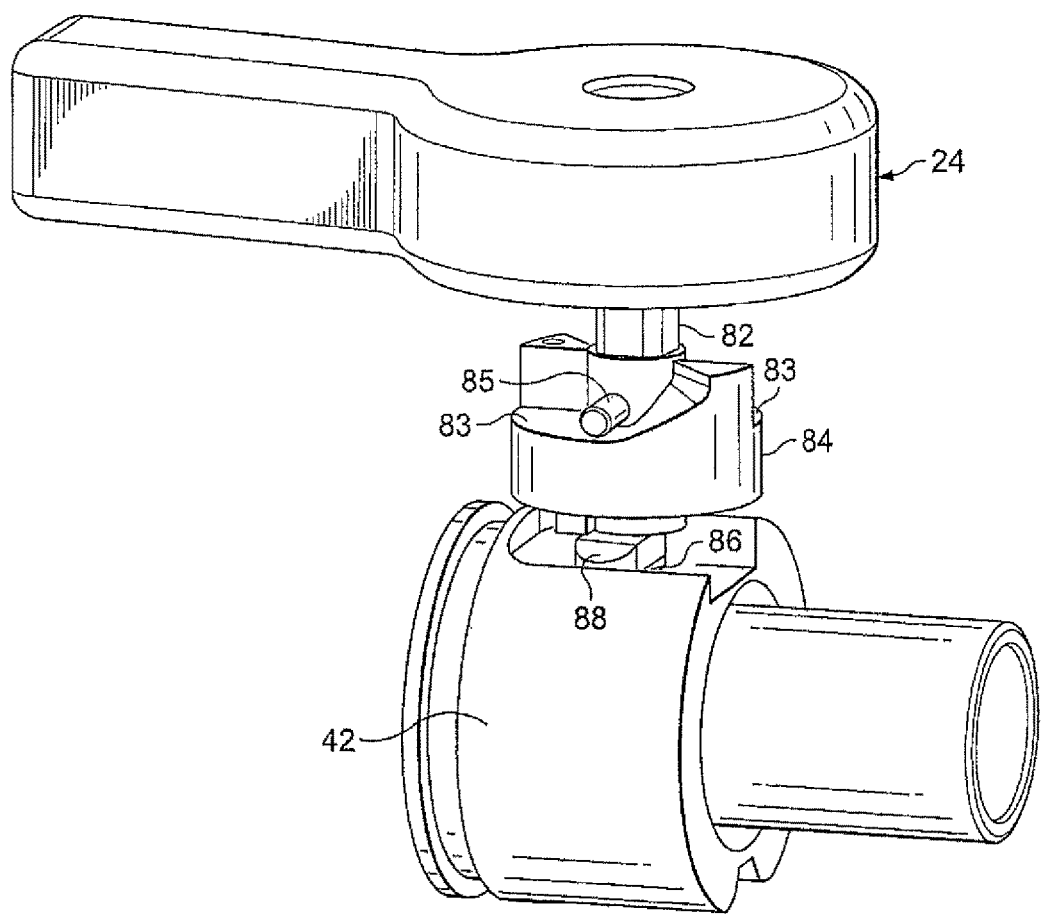
FIG. 8 illustrates the handle and the cam when the valve is partially rotated, between the hot bypass mode and the cold bypass mode.
Figure 9:
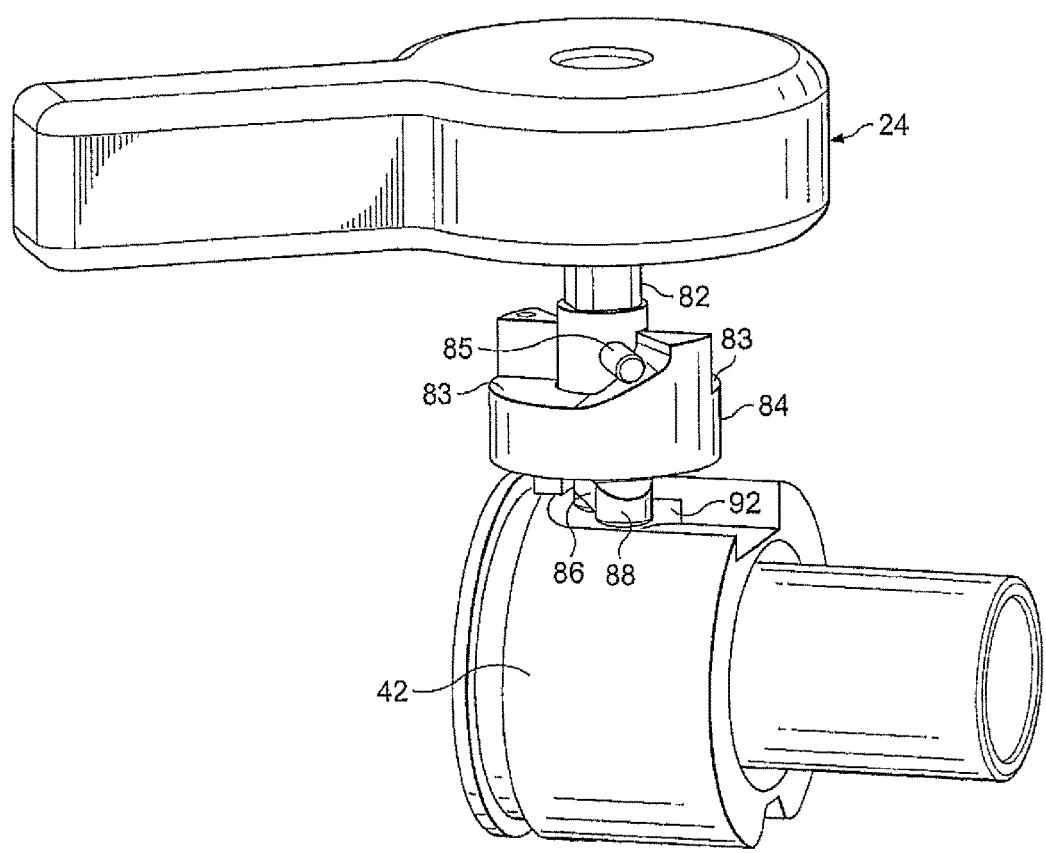
FIG. 9 illustrates the handle and the cam when the valve is completely rotated counterclockwise and the valve is in the cold bypass mode.

FIG. 7 shows the cam 88 position in the hot bypass mode, corresponding to FIG. 4. Upon rotation of the handle 90 and the cam 88 in the clockwise direction and laterally engages a flange 92 annularly defined about the proximal end of sleeve 42 as shown in FIG. 8. As the handle 90 and cam 88 continue to rotate the cam 88 pushes the sleeve 42 proximally, as shown in FIG. 9, such that piston 50 extends distally into sleeve 42 and closes passageway 56, and thus restricts fluid flow in the valve 22 in the cold bypass mode. The pin 85 riding along the upper surface of collar 84 helps reduce friction between cam 88 and the surface of sleeve 42 during rotation. In the cold bypass mode, cold water is thus directed to showerhead 14 to provide a cold shower.

When the handle 90 is rotated counter-clockwise, from the position shown in FIG. 9 to the position shown in FIG. 7, the cam 88 retracts from flange 92 and the spring 78 pushes the sleeve 42 back into the hot bypass mode such as shown in FIG. 3 and FIG. 4, such that the piston 50 can move in response to the extended actuator nose 74.

Advantageously, the valve 22 can operate to automatically deflect hot water to the showerhead 14, referred to as the hot mode, or can be manually set to manually directed cold water to the showerhead 14, referred to as the cold mode. In both modes, a significant water savings is obtained by preventing an excess amount of water being dispensed through the tub faucet to establish the shower mode with either hot or cold water.

Figure 10:
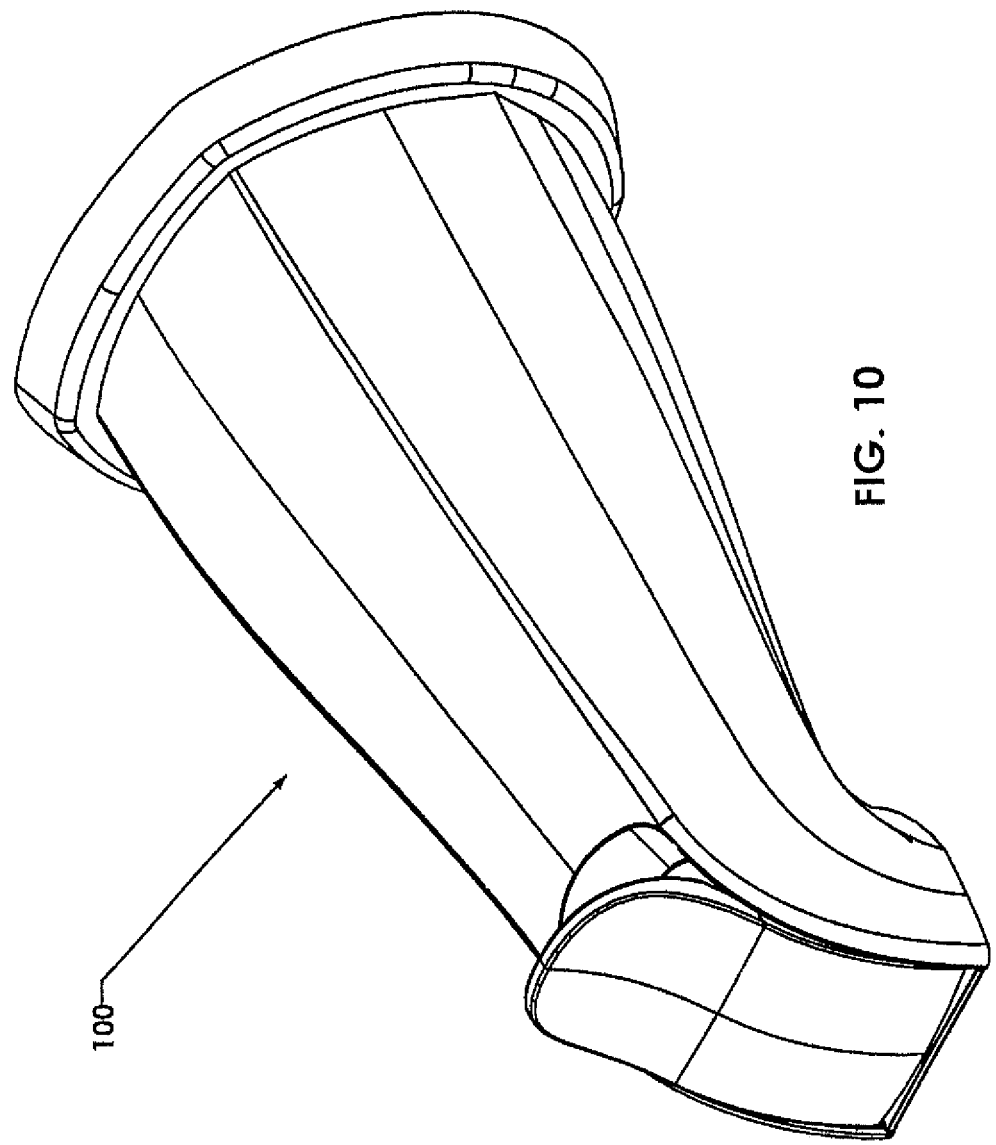
FIG. 10 illustrates a perspective view of a tub faucet according to a second embodiment, and that is usable in the water control system of FIG. 1.

Referring now to FIG. 10, there is shown a perspective view of another embodiment of a tub faucet at 100 including a temperature controlled diverter and a reset/override member that can be reset with less than 10 lbs. of pressure and meets the American Disabilities Act (ADA) requirements.

Reset Mode

Figures 11, 12:
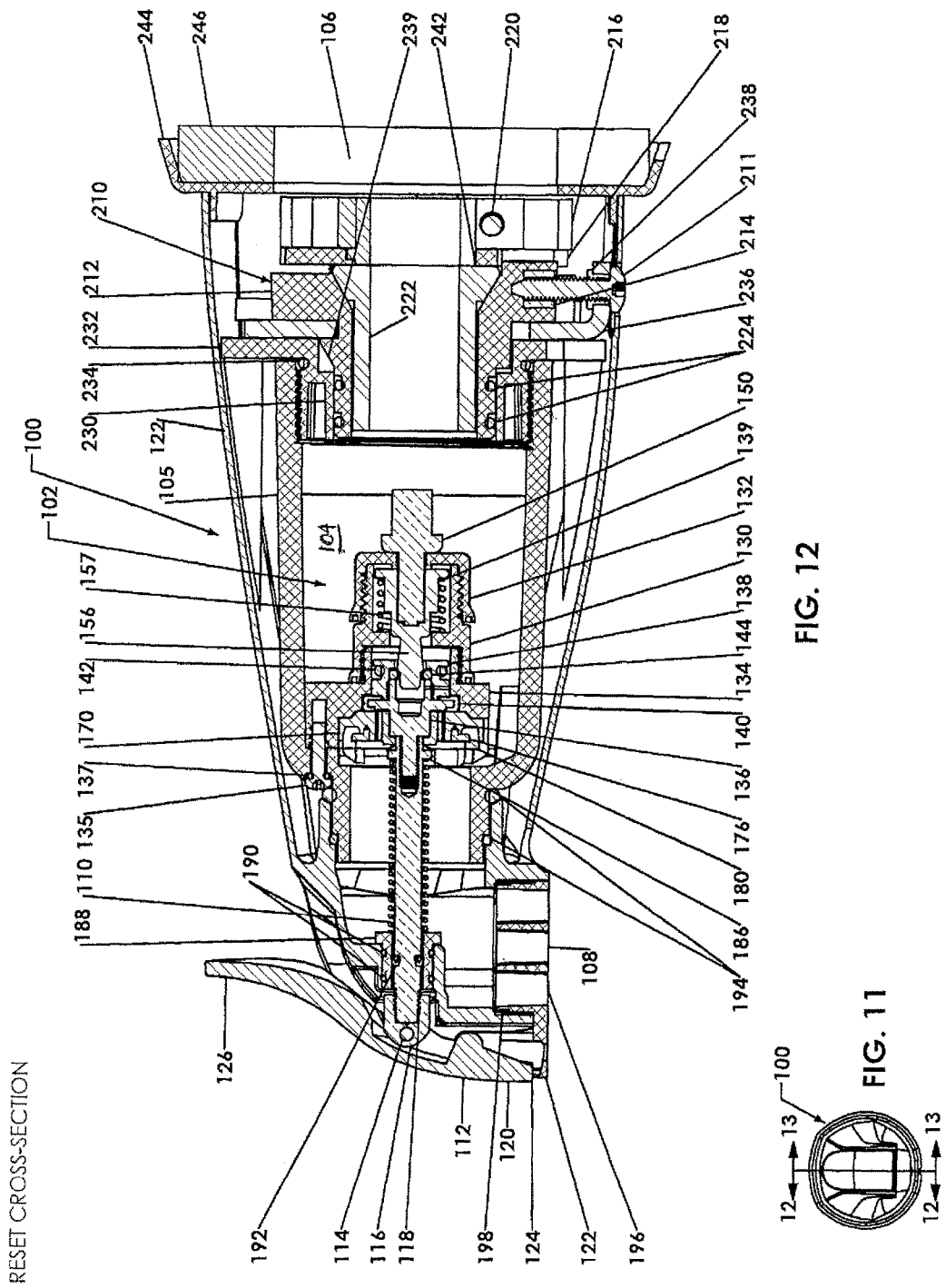
FIG. 11 is a front end view of the faucet of FIG. 10.
FIG. 12 is a side sectional view taken along line 12-12 in FIG. 10 when the valve in the Reset Mode.
Figure 15:
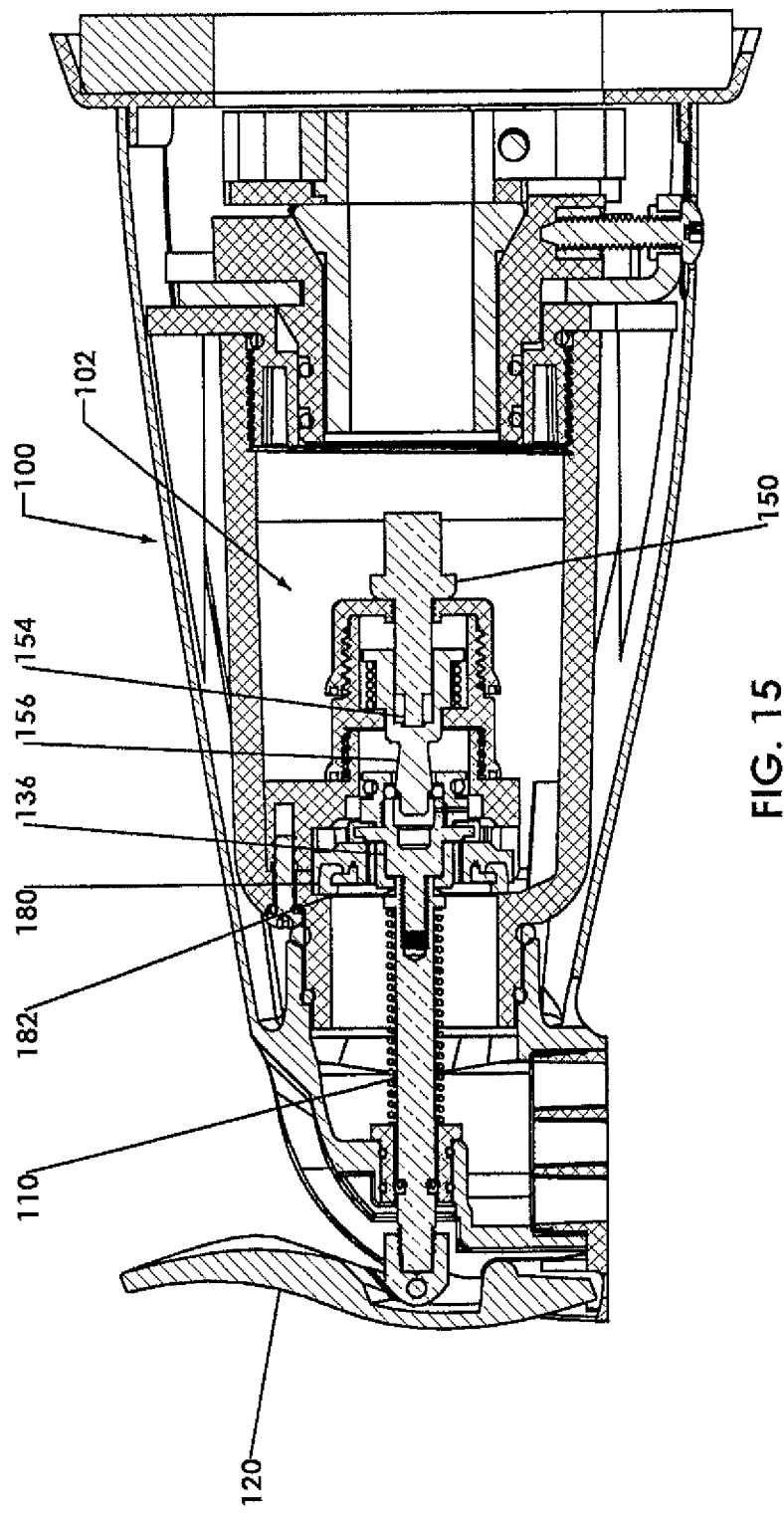
FIG. 15 is a side sectional view taken along line 12-12 in FIG. 10 when the valve in the Auto-Divert Mode.

FIG. 10 shows faucet 100 in the Reset Mode, which is defined as the mode when the faucet 100 is not in use, and when water flowing through the faucet 100 is below a predetermined temperature threshold at which point the faucet 100 would enter the Auto-Divert Mode (FIG. 15). FIG. 11 shows a front view of faucet 100, and FIG. 12 shows a side sectional view of the faucet 100 in the Reset Mode, taken along line 12-12 in FIG. 11. FIG. 13 shows a side sectional view of the faucet 100 in the Reset Mode, taken along line 13-13 in FIG. 11, and FIG. 14 is an enlarged view of a diverter valve shown in FIG. 13.

The faucet 100 includes a diverter valve 102 positioned in a water flow channel 104 defined in an outer body 105, shown in a first position. The channel 104 longitudinally extends through the faucet 100 from an inlet port 106 to an outlet port 108. The valve 102 is configured to be automatically positioned in the channel 104 as a function of the temperature of water flowing through channel 104.

As will be discussed shortly, the valve 102 is also manually positionable as a function of a longitudinally piston shaft 110 extending longitudinally in a distal end of the channel 104. A vertically extending lever 112 is positioned at the distal end of faucet 100 and is pivotably connected to a distal end of shaft 110 at a pivot 114. The pivot 114 is formed in a pivot coupler 116 threadably connected to a threaded distal end 118 of shaft 110. A lower end 120 of lever 112 is pivotably connected to a distal end of faucet housing 122 at pivot 124 forming a leverage point. An upper end 126 of lever 112 can be grasped by a user and pulled outwardly to manually set the valve 102 in an arrangement such that the faucet is in a Manual Divert Mode and water is diverted to the showerhead 14, such as to take a cold shower. The upper end 126 can also be pushed by a user toward the faucet housing 122 using less than 10 lbs. of force, meeting the ADA requirement, to set the valve 102 in a Manual Bypass Mode such that hot water continues to flow through the channel 104 regardless of water temperature to take a hot bath. This Manual Bypass Mode allows water to bypass the valve 102, and is also referred to as an override position.

Referring to FIGS. 12-14 illustrating the Reset Mode, the valve 102 is configured to restrict the flow of water through the channel 104 when water flowing through the channel 104 reaches and exceeds a temperate threshold. When the valve 102 is closed, the water flow is automatically directed from the faucet 100 to the showerhead 14. Thus, the valve 102 operates as both a temperature controlled valve and also as a tub spout diverter valve. The valve 102 is shown in a first position allowing water to freely flow in channel 104 from the inlet port 106 and freely pass around valve 102 to the outlet port 108. Valve 102 is secured in the tubular outer body 105.

Valve 102 comprises of an annular actuator adapter 130 having a proximal end threadably receiving a distal end of an annular actuator cap 132. An annular piston diverter shield 134 has a proximal end threadably receiving a distal end of adapter 130. Shield 134 is secured in a distal end of outer body 105 by a screw 135, and a seal 137 provides a liquid seal about the screw 135. A two piece annular piston shaft receiver is positioned in shield 134, and comprises a distal piston shaft receiver 136 and a proximal piston shaft receiver 138 with a piston receiver seal 140 interposed between the two receivers. An outer receiver seal o-ring 142 provides a seal between the proximal shaft receiver 138 and an inner surface of shield 134, and a piston gland o-ring 144 extends annularly about an inner wall of proximal shaft receiver 138, located proximal of the distal piston shaft receiver 136.

A thermal actuator 150 is threadably received through an opening 152 in the proximal end of actuator cap 132. The actuator 150 may be a paraffin wax actuator, or other temperature sensitive actuator, such as a bi-metal spring. The actuator 150 has an actuator nose 154 that axially extends as water temperature increases, and responsively pushes a proximal end of a longitudinally movable piston 156 when the temperature of water passing about the proximal end of actuator 150. Piston 156 has a proximal end positioned in adapter 130 and receiving the distal end of actuator 150. A spring 157 is positioned within adapter 130 between a distal flange of adapter 130 and a proximal flange of piston 156, and is in the compressive mode operative to retract piston 156 proximally. Piston 156 has a distal end extending through a distal opening of adapter 130 and into proximal shaft receiver 138. Piston 156 has an annular shoulder 158 configured to be received in and engage the piston gland o-ring 144.

In the Reset Mode, there is spacing between the distal end of piston 156 and an inner surface 160 defined in an inner portion 162 of distal piston shaft receiver 136. A pilot hole forming a passageway 164 is shown extending from the inner portion 162 through both the distal piston shaft receiver 136 and the proximal piston shaft receiver 138. An annular outer piston body 170 encompasses the distal piston shaft receiver 136, and has a plurality of parallel longitudinal openings 172 forming passageways from a distal side of the annular outer piston body 170 to a proximal side of the annular outer piston body 170, openings 172 abutting a distal side of flange 174 of distal piston shaft receiver 136. The seal 140 encompasses a periphery of flange 174. An annular inner piston body 176 encompasses the distal end of outer piston body 170. The passageway 164 and the openings 172 are configured to prevent hammering of the valve 102 by providing a hydraulic shock, and also to reduce the required force using lever 112 to reset the valve 102 in a Bypass Mode compliant with the ADA, as will be described in more detail shortly.

An annular piston body seal 180 is secured within outer piston body 170, and securely encompasses the periphery of inner piston body 176. The seal 180 is comprised of a resilient material, and specifically a material that is resistant to build-up of materials such as calcium and other materials over time as water flows past the seal 180. In the Auto Divert Mode, as will be described shortly, the distal face of seal 180 is configured to be urged by actuator 150 against an opposing seal interface 182, formed as an annular shoulder at the proximate end of body 105, to provide a seal and also prevent leakage over time.

A shaft spring 184 encompasses piston shaft 110 and is compressed between a piston shaft receiver flange 186 formed distal of outer piston body 170 and a shaft bushing 188. Bushing 188 extends in a distal opening of housing 122 and has a pair of bushing o-rings 190 positioned around the bushing 188 and providing a liquid seal between the bushing 122 and the housing 122. A shaft o-ring 192 is positioned around piston shaft 110 and provides a liquid seal between the shaft 110 and the bushing 188. A pair of body o-rings 194 are each positioned about a distal end of outer body 105 and form a liquid seal between the outer body 105 and the housing 122. A tub spout water shaping grate 196 is secured in the outlet port 108, and a grate o-ring 198 provides a liquid seal between the grate 196 and the housing 122.

Auto-Divert Mode

Referring now to FIGS. 15-17, the valve 100 is shown in the Auto-Divert Mode. When the temperature of water flowing through the channel 104 increases and reaches or exceeds a predetermined temperature, such as 90 degrees Fahrenheit, the actuator 150 heats up and actuator nose 154 responsively extends axially such that it engages and urges the piston 156 distally. The piston shoulder 158, in turn, pushes and urges against the piston gland o-ring 144, without extending further through the o-ring 144, such that the distal piston shaft receiver 136 moves distally until the seal 180 engages seal interface 182 and seals the channel 104. Distal piston shaft receiver 136 continues to urge seal 180 against the seal interface 182 to maintain a complete liquid seal, such that no fluid leaks past valve 102, and thus water is prevented from flowing through the channel 104. Consequently, the piston shaft 110 extends distally and urges the lever 120 outwardly from housing 122 such that the lever is substantially vertical. Therefore, the closed valve 102 functions as an automatic diverter, configured to prevent water from flowing through the channel 104 when in a second position as a function of a parameter, such as water temperature, and water flow is automatically directed from the faucet 100 to the showerhead 14.

Bypass Mode

Figure 18:
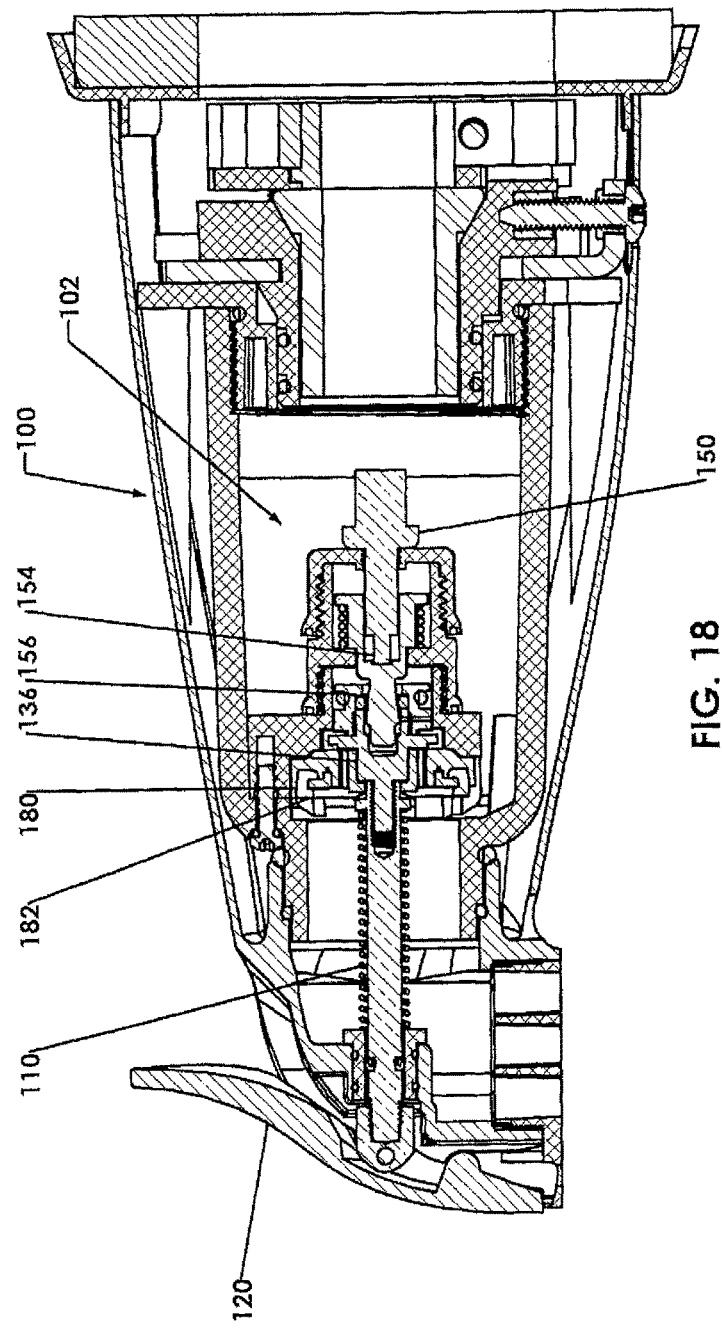
FIG. 18 is a side sectional view taken along line 12-12 in FIG. 10 when the valve in the Bypass Mode.

Referring to FIGS. 18-20, the valve 100 is shown in the Bypass Mode. In this Bypass Mode, water is allowed to continue flowing through channel 104 regardless of the water temperature, allowing the faucet to fill a tub and allow a user to take a bath. The amount of force required by the user to put the valve 100 in the Bypass mode is less than 10 lbs. to meet the ADA requirements, which is 10 lbs., and the applied force may be as little as 6 lbs. when the water pressure at the inlet port is 120 pounds per square inch (psi).

This low user force is created due to numerous design features as will now be described in detail. This Bypass Mode is entered from the Auto-Divert Mode by a user providing a force to the upper portion 126 of lever 120 and toward the faucet 100, such that the lever 120 rotates about pivot 124 to create a lever arm and a moment force. The user may conveniently use the palm of a hand, or other body part such as an arm or foot.

As the lever 120 is rotated toward the faucet 100, the shaft 110 is responsively urged through the bushing 188 to urge the distal piston shaft receiver 136 proximal. Because the actuator tip 154 is already extended it provides a resistance to the piston 156, such that the distal piston shaft receiver 136 is pushed proximal and the distal end of piston 156 is urged through the gland o-ring 144 and into the inner portion of the distal piston shaft receiver 136. FIG. 20 shows an enlarged view, where the seal 180 is retracted from the seal interface 182 and water is allowed to resume flowing in the channel 104 and past the valve 102, past the seal 180.

Figure 21:
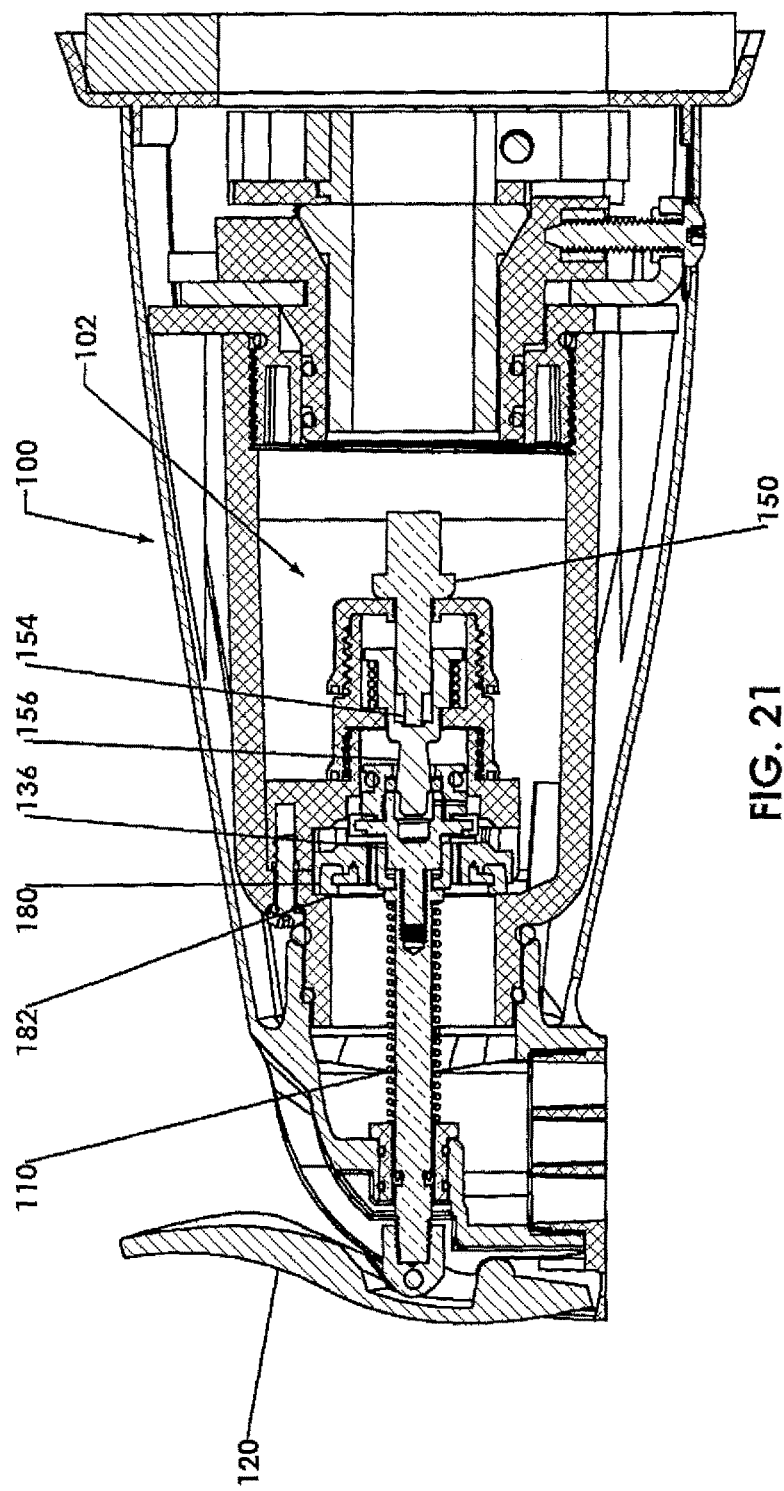
FIG. 21 is a side sectional view taken along line 12-12 in FIG. 10 when the valve initiates moving from the Auto-Divert Mode to the Bypass Mode, creating a passageway allowing fluid to pass through the passageway and the distal shaft receiver openings to reduce a pressure differential.
Figure 22:
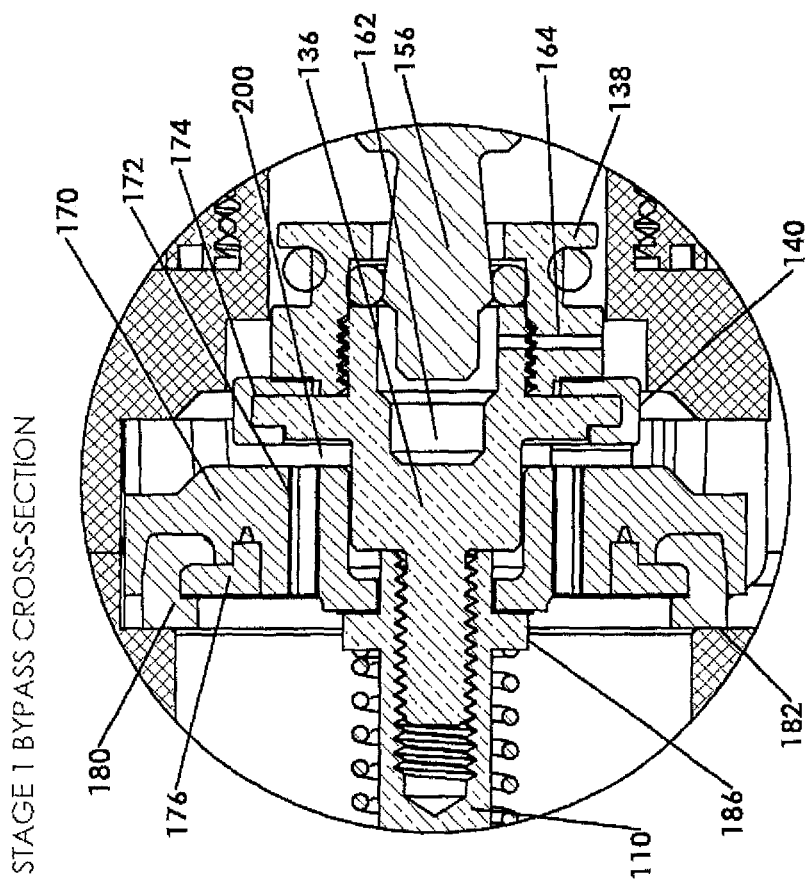
FIG. 22 is an enlarged view of the valve as shown in FIG. 21 illustrating the passageway and openings creating a fluid path.
Figures 23, 24:
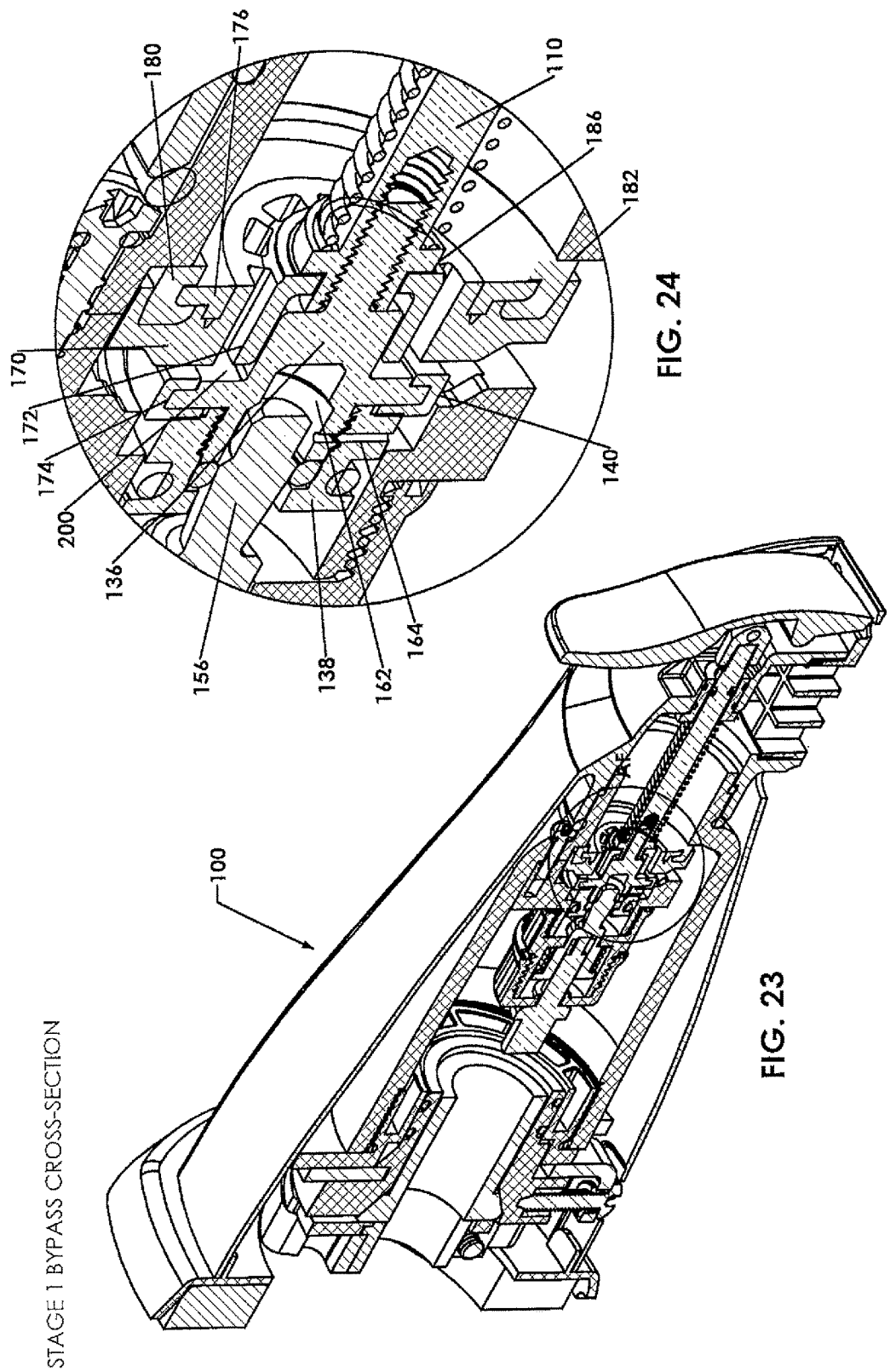
FIG. 23 is a side sectional view taken along line 13-13 in FIG. 21.
FIG. 24 is an enlarged view of the valve shown in FIG. 21.

Referring to FIGS. 21-23, there is shown the valve 102 when the Bypass Mode is initiated. The force required to enter the Bypass Mode is reduced to meet the 10 lb. ADA requirement because upon pushing the lever 120 with such a small force, the shaft 110 initially pushes the distal piston shaft receiver 136 proximal such that shaft flange 186 is moved proximally until it engages outer piston body 170 while the seal 180 maintains stationary, such that they separate from one another and create a spacing 200 between them. This created spacing 200 forms a flow passageway allowing water to flow from proximal of the valve 102 around seal 140, through the spacing 200 and the openings 172 to reduce the pressure differential across the valve 102. This differential pressure reduction may be referred to as enabling the distal piston shaft receiver 136 to pop-off. As the pressure differential is reduced, a lower force is required to then urge the seal 180 to separate from seal interface 182 and further reduce the pressure differential and open the channel to resume continuous flow through the channel 104.

Together, the lever arm, and the differential pressure reduction mechanism allows the valve 102 to transition from the Auto-Divert Mode to the Bypass mode while meeting the ADA requirements.

Cold Mode

The valve 102 can be manually set in the position shown for the Auto-Divert Mode by the user to take a cold shower. The user simply pulls the upper portion 126 of lever 120 to manually pull the shaft 110 and the seal 180 forward. This causes the seal 180 to engage the seal interface 182 and the water pressure will maintain the seal, such that cold water is diverted to the showerhead 14. In this mode, the actuator tip 154 is not extended since the water temperature is below the predetermined temperature threshold. The valve can be reset from the Cold Mode to the Reset Mode as described above, by a user imparting a force on the lever 120 that meets the ADA requirements.

In the Cold Mode, Bypass Mode, or the Auto-Divert mode, the valve 102 will automatically move to the Reset Mode when water pressure is removed from the faucet 100, such as using handle 19, due to the shaft spring 184 pushing the valve 102 toward the inlet port.

Hammer Elimination

Hammering of the valve 102 is eliminated due to several features. Hammering is defined as the mechanical resonance of the valve 102 causing the valve 102 to repeatedly hit the seal interface 182, which may sound like a jack hammer.

Referring back to FIGS. 12-14, and FIGS. 22-24, as the valve 102 transitions from the Reset Mode to the Auto-Divert Mode, or into the Cold Mode, the seal 180 will eventually engage the seal interface 182. As shown in FIGS. 22-24, the distal piston shaft receiver 136 will be pushed forward by the water pressure, causing it to be pulled ahead and in advance of the flange 174. When the seal 180 engages the seal interface 182 to create a seal, water is disposed in a pocket defined between seal 140 and seal 142 and forms a hydraulic shock absorber. The water in this pocket can only flow through passageway 164 to spacing 162 such that the valve 102 can't hammer. This may be referred to as a soft-close such that the valve 102 won't mechanically resonate or hammer.

The passageway 164 extends from the inner portion of the distal piston shaft receiver 136 to the channel 104, such that water is positioned in the space 162 between the piston 156 and inner surface 160. As the seal 180 engages the seal interface 182 with momentum, the fluid in the space 162 also dampens the piston 156 from hammering in the distal piston shaft receiver 136. The passageway 164 allows fluid to be transferred between the space 162 and the channel 104 to also form a hydraulic shock absorber.

Leak Proof Valve Seal

As previously detailed with respect to FIGS. 15-17, the seal 180 is comprised of a resilient material, and specifically a material that is resistant to the build-up of materials such as calcium and other materials over time as water flows past the seal 180. The distal face of seal 180 is configured to be urged by actuator 150 against an opposing seal interface 182, formed as an annular shoulder at the proximate end of body 105, to provide a seal and also prevent leakage over time.

Universal Tub Spout Adapter

Referring to FIG. 25, a rear perspective view of faucet 100 is shown including a universal pipe mounting adapter 210 secured in the proximal end of faucet 100. There are four different embodiments of the universal adapter as will be detailed.

Figure 29:
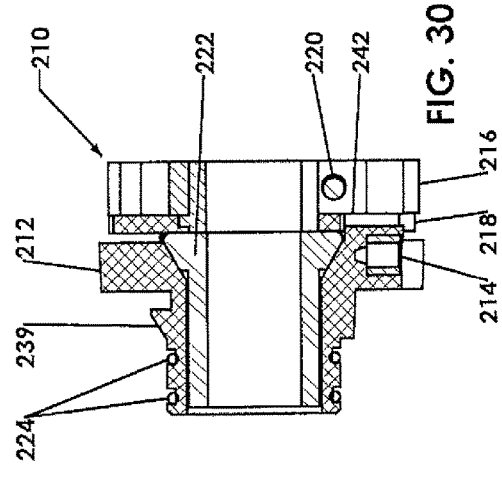
FIG. 29 is a front view of the universal adapter of FIG. 27.
Figure 27:
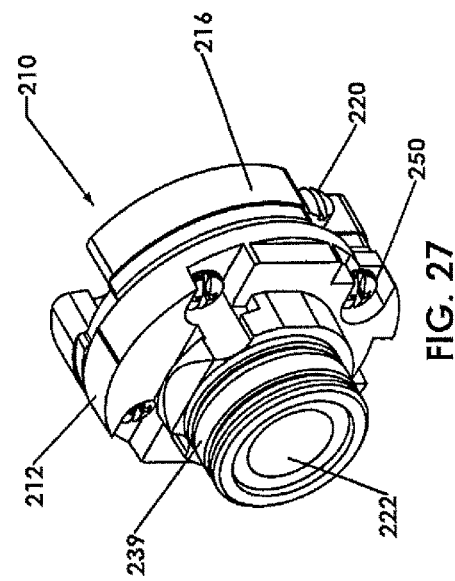
FIG. 27 is a perspective view of a first embodiment of a universal tub spout adapter configured to be compressed about a copper pipe.
Figure 30:
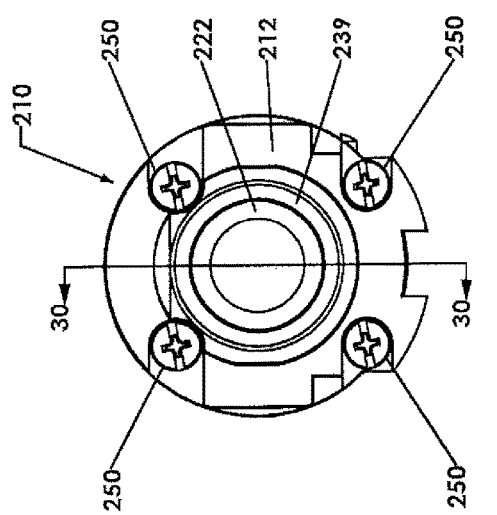
FIG. 30 is a side sectional view of the universal adapter of FIG. 27 taken along line 30-30 in FIG. 29.
Figure 28:
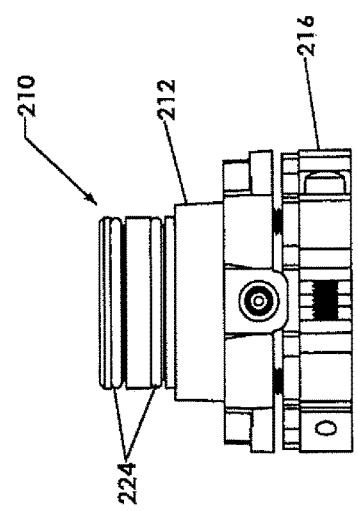
FIG. 28 is a side view of the universal adapter of FIG. 27.
Figure 34:
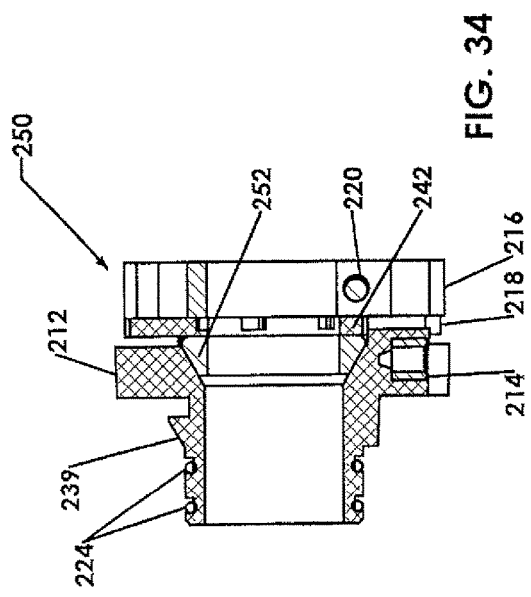
FIG. 34 is a side sectional view of the universal adapter of FIG. 31.
Figure 31:
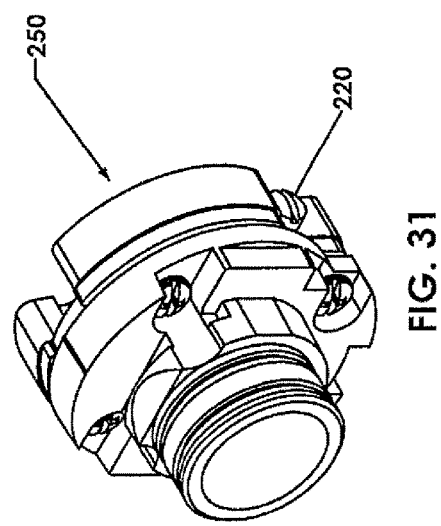
FIG. 31 is a perspective view of a second embodiment of a universal tub spout adapter configured to be compressed about galvanized pipe.
Figure 33:
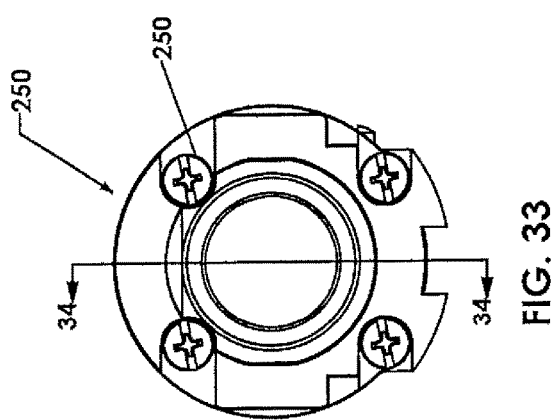
FIG. 33 is a front view of the universal adapter of FIG. 31.
Figure 32:
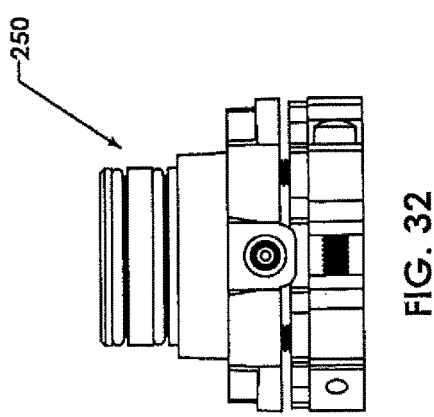
FIG. 32 is a side view of the universal adapter of FIG. 31.
Figure 38:
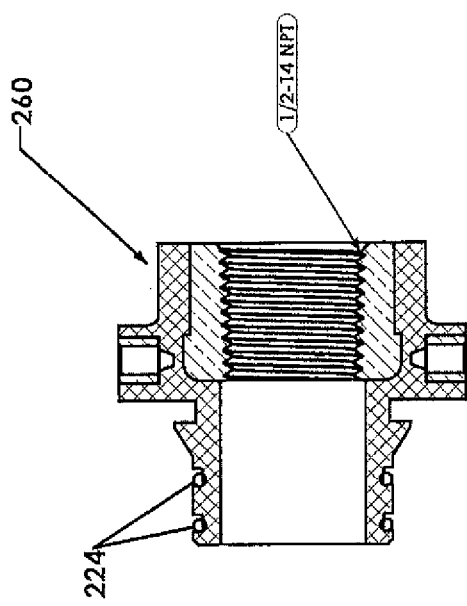
FIG. 38 is a side sectional view of the universal adapter of FIG. 35.
Figure 35:
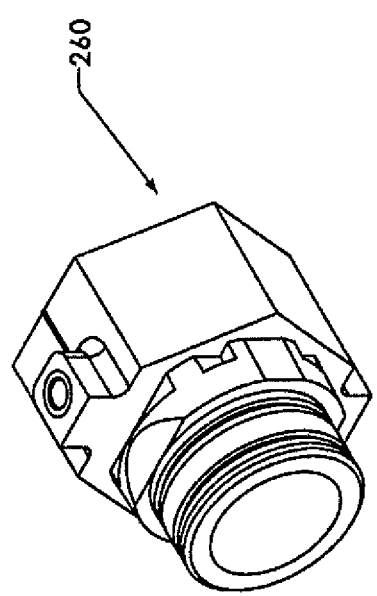
FIG. 35 is a perspective view of a third embodiment of a universal tub spout adapter configured to be connected to a threaded pipe.
Figure 37:
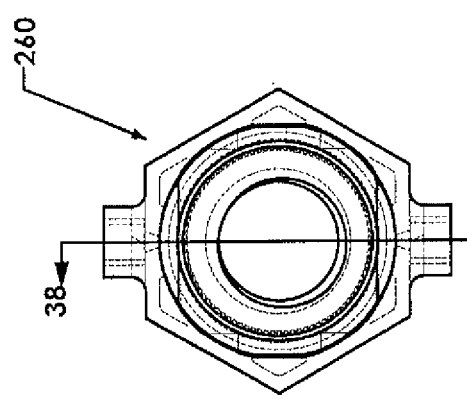
FIG. 37 is a front view of the universal adapter of FIG. 35.
Figure 36:
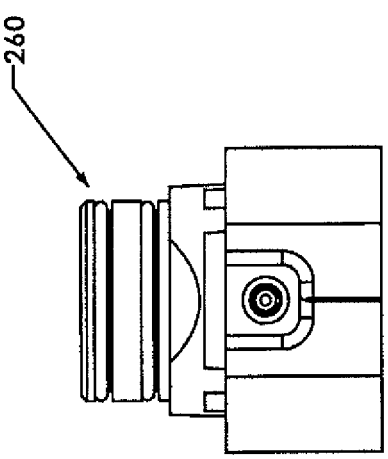
FIG. 36 is a side view of the universal adapter of FIG. 35.
Figure 39:
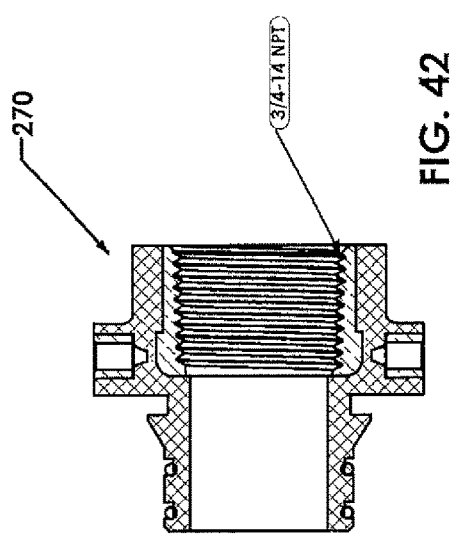
FIG. 39 is a perspective view of a forth embodiment of a universal tub spout adapter configured to be connected to a threaded pipe.
Figure 42:
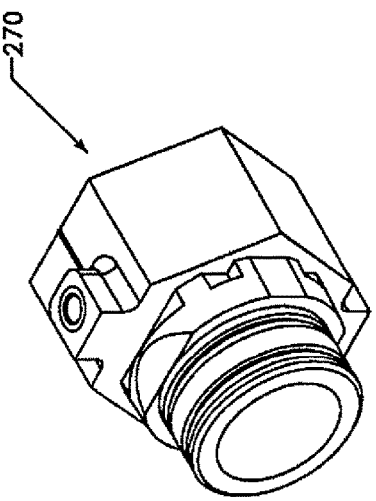
FIG. 42 is a side sectional view of the universal adapter of FIG. 39.
Figure 41:
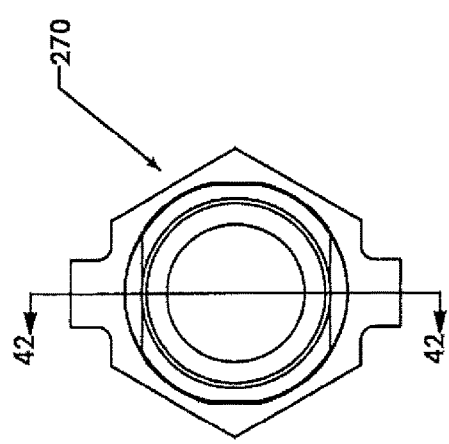
FIG. 41 is a front view of the universal adapter of FIG. 39.
Figure 40:
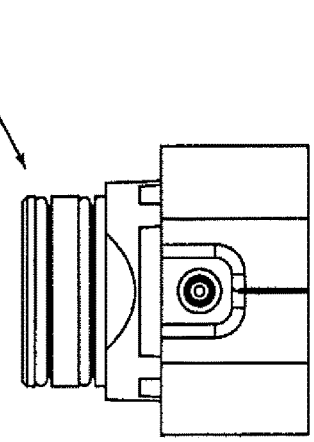
FIG. 40 is a side view of the universal adapter of FIG. 39.

FIG. 26 illustrates a bottom view of the faucet 100;

FIGS. 27-30 illustrate the first embodiment of the universal adapter 210 seen to include an annular snap lock receiver mount 212 configured as a sleeve and having a bottom anchor insert 214, an annular compression plate 216 and an annular spacer plate 218. A fastener 220, such as a screw, is configured to secure the compression plate 216 to the pipe. An annular compression seal 222 also configured as a sleeve is axially positioned within the receiver mount 212 and is configured to make a liquid seal about a copper pipe inserted through the compression seal 222. A pair of mount o-rings 224 are each annularly positioned about a distal end of the receiver mount 212 and are configured to provide a liquid seal between the receiver mount 212 and an inner flange 230 of body end 232 threadably received in the proximal end of outer body 105, as shown in FIG. 12. A receiver o-ring 234 provides a liquid seal between the body end 232 and outer body 105. A mounting tab 236 has an insert 238 configured to receive the fastener 211 to secure the adapter 210 within the proximal end of faucet 100. Mount 212 has an annular angled tab 239 configured to be inserted through mounting tab 236 and snapped into place behind the tab 236 in a tight fit such that o-ring seals 224 create a liquid seal. The fastener 220 is configured to threadably extend through compression plate 216 to secure the compression plate 216 about an annular pipe. Compression seal 242 creates a seal around the pipe by fasteners 250 compressing the receiver mount 212 against the annular compression plate 216 and an annular spacer plate 218. Faucet 100 has a escutcheon plate 244 and a foam spacer 246 at the proximal end. As shown in FIG. 29, four fasteners 250, such as screws, are configured to each extend through a distal end of mount 212 to secure the mount 212 to compression plate 216.

Referring to FIGS. 31-34, there is shown a second embodiment of a universal mounting adapter 250 configured to be secured to galvanized pipe. This embodiment is similar to the adapter 210 of FIGS. 27-30, except that the sleeve type compression seal 222 is replaced with an annular galvanized pipe seal 252 that has the same inner diameter as receiver mount 212, and axially extends only in the proximal end of the mount 212.

Referring to FIGS. 35-38, there is shown a third embodiment of a universal mounting adapter 260 configured to be attached to a threaded pipe stub.

Referring to FIGS. 39-42, there is shown a fourth embodiment of a universal mounting adapter 270 configured to be attached to a threaded pipe stub, similar to adapter 260 but having a different threading.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A system, comprising:
   a tub faucet having a main body including a channel extending through the main body, the channel configured to receive water at an inlet port and pass water to an outlet port that is configured to dispense water into a bathing tub;
   a showerhead fluidly coupled to the tub faucet;
   a temperature controlled actuator disposed in the channel and responsive to a temperature of water in the channel;
   a diverter disposed in the tub faucet and configured to automatically divert a flow of water from the tub faucet to the showerhead as a function of the temperature controlled actuator; and
   a hydraulic dampener configured to prevent the diverter from hammering in the channel, wherein the dampener is disposed in the channel between the inlet port and the outlet port, and the dampener is configured to allow water to pass from the inlet port to the outlet port, past the dampener, wherein the dampener is responsively coupled to the temperature controlled actuator such that the dampener responsively dampens the diverter when the temperature controlled actuator actuates.

2. The valve as specified in claim 1, wherein the dampener is configured to dampen the flow control member when there is no pressure differential between the inlet port and the outlet port of the tub faucet.

3. The valve as specified in claim 1, wherein the diverter has an inner portion and an outer portion, wherein the diverter has a passageway extending through the diverter from the diverter inner portion to the diverter outer portion, the passageway configured to allow water to flow from the channel into the diverter inner portion, through the passageway and exit through the outlet port such that the diverter also functions as the hydraulic dampener.

4. The system as specified in claim 3, wherein the diverter comprises a flow control member configured to control a flow of water through the channel responsive to the temperature controlled actuator, the flow control member movable between a first position and a second position, where in when the flow control member is in the first position the flow control member is configured to allow the flow of water through the channel as a function of the temperature controlled actuator, where in when the flow control member is in the second position water is substantially blocked from flowing through the channel.

5. The system as specified in claim 1 further comprising a bypass member configurable in a bypass position to allow water to flow through the channel, wherein approximately 10 lbs. or less of force is required to be applied to the bypass member to urge the bypass member toward the bypass position and allow water to flow though the channel when water pressure is applied to the inlet port.

6. The system as specified in claim 1, wherein the diverter is configured to control a flow of water through the showerhead and is configured to trickle when water is first diverted to it, and is also configured to allow water to flow through the showerhead regardless of the temperature of water flowing through the showerhead.

7. The system as specified in claim 1, further comprising a bypass member coupled to the flow control member, such that water is configured to resume flow through the channel when the bypass member urges the flow control member toward the inlet port from the second position.

8. A tub faucet valve, comprising:
   a main body including a channel extending through the main body, the channel configured to receive water at an inlet port and pass water to an outlet port that is configured to dispense water into a bathing tub;
   a temperature controller actuator disposed in the channel and responsive to a temperature of water in the channel;
   a flow control member configured to control a flow of water in the channel responsive to the temperature controller actuator, the flow control member moveable between a first position and a second position, where in when the flow control member is in the first position the flow control member is configured to allow the flow of water through the channel as a function of the temperature of water in the channel, where in when the flow control member is in the second position water is substantially blocked from flowing in the channel; and
   a dampener configured to prevent the flow control member from hammering in the channel, wherein the dampener is disposed in the channel between the inlet port and the outlet port, and is configured to allow water to pass from the inlet port to the outlet port, past the dampener, wherein the dampener is responsively coupled to the temperature controlled actuator such that the dampener responsively dampens the flow control member when the temperature controlled actuator actuates.

9. The valve as specified in claim 8, wherein the dampener comprises a seal disposed about the flow control member, the seal configured to engage a seal interface when the flow control member is in the second position such that water is substantially blocked from flowing in the channel, wherein the dampener is configured to allow water from the inlet port to flow through the dampener, and exit the outlet port when the seal does not engage the seal interface.

10. The valve as specified in claim 8, wherein the temperature controlled actuator extends into an inner portion of the flow control member.

11. The valve as specified in claim 10, wherein the temperature controlled actuator is configured to urge the flow control member toward the outlet port as a function of the temperature of water in the channel, wherein water is configured to flow between the temperature controlled actuator and the inner portion.

12. The valve as specified in claim 8, wherein the flow control member has an inner portion and an outer portion, wherein the flow control member has a passageway extending through the flow control member from the inner portion to the outer portion, the passageway configured to allow water to flow from the channel into the inner portion, through the passageway and out the outlet port such that the flow control member also functions as the dampener.

13. The valve as specified in claim 8, further comprising a bypass member coupled to the flow control member, wherein water is configured to resume flow through the channel when the bypass member urges the flow control member toward the inlet port from the second position.

14. The valve as specified in claim 13, wherein the bypass member is configured to allow flow of water through the channel to reduce a pressure differential between the outlet port and the inlet port when the bypass member urges the flow control member toward the inlet port from the second position.

15. The valve as specified in claim 8, wherein the dampener is configured to allow flow of water through the channel when there is no pressure differential between the inlet port and the outlet port.

16. The valve as specified in claim 12, wherein the flow control member has at least one opening configured to allow water to flow through the at least one opening and also through the passageway when the bypass member urges the flow control member toward the inlet port from the second position.

17. The valve as specified in claim 16, wherein water is configured to momentarily flow through the passageway when the flow control member reaches the second position.

18. The valve as specified in claim 17, wherein the flow control member has a seal, wherein the passageway is configured to allow flow of water through the passageway to damper the flow control member as the seal engages a seal interface.

\* \* \* \* \*